(12) United States Patent
Kim et al.

(10) Patent No.: US 12,263,576 B2
(45) Date of Patent: Apr. 1, 2025

(54) ROBOT SYSTEM FOR AUTOMATED ASSEMBLY OF MODULAR COMPONENT

(71) Applicant: HYUNDAI MOBIS CO., LTD., Seoul (KR)

(72) Inventors: Young Min Kim, Osan-si (KR); Dong Jin Yoon, Suwon-si (KR); Hun Chul Kim, Seoul (KR); Hee Kuk Kang, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 364 days.

(21) Appl. No.: 17/852,932

(22) Filed: Jun. 29, 2022

(65) Prior Publication Data
US 2023/0054602 A1 Feb. 23, 2023

(30) Foreign Application Priority Data

| Aug. 19, 2021 | (KR) | 10-2021-0109212 |
| Aug. 19, 2021 | (KR) | 10-2021-0109216 |
| Aug. 20, 2021 | (KR) | 10-2021-0110316 |
| Aug. 23, 2021 | (KR) | 10-2021-0111155 |

(51) Int. Cl.
*B25J 15/00* (2006.01)
*B23P 19/06* (2006.01)
*B25J 9/16* (2006.01)
*B25J 15/04* (2006.01)
(Continued)

(52) U.S. Cl.
CPC .............. *B25J 15/04* (2013.01); *B23P 19/06* (2013.01); *B25J 9/1687* (2013.01); *B25J 19/005* (2013.01); *B25J 19/023* (2013.01)

(58) Field of Classification Search
None
See application file for complete search history.

(56) References Cited

U.S. PATENT DOCUMENTS

| 2011/0047788 | A1* | 3/2011 | Immekus | B23P 21/00 29/729 |
| 2011/0048649 | A1 | 3/2011 | Komatsu et al. | |
| 2012/0197438 | A1 | 8/2012 | Ogami | |

(Continued)

FOREIGN PATENT DOCUMENTS

| CN | 113042996 A | 6/2021 |
| JP | 2012030320 A | 2/2012 |

OTHER PUBLICATIONS

Singapore Office Action dated Oct. 29, 2024 issued in corresponding Singapore Patent Application No. 10202250464A.

*Primary Examiner* — Truc M Do
(74) *Attorney, Agent, or Firm* — NovoTechIP International PLLC

(57) ABSTRACT

According to at least one aspect, the present disclosure provides a robot system for automatically assembling a modular component and an assembly target, comprising: an assembly robot including a first manipulator, an assembly tool coupled to the first manipulator and configured to assemble the modular component and the assembly target, and a first camera configured to capture images in a direction in which the assemble tool faces; a loading robot including a second manipulator and a gripper coupled to the second manipulator and configured to grip the modular component; and a control device configured to control the assembly robot and the loading robot.

16 Claims, 36 Drawing Sheets

(51) Int. Cl.
    *B25J 19/00*         (2006.01)
    *B25J 19/02*         (2006.01)

(56)         References Cited

U.S. PATENT DOCUMENTS

| | | | |
|---|---|---|---|
| 2014/0060948 A1* | 3/2014 | Kroecker | B65D 90/0006 |
| | | | 180/167 |
| 2016/0306340 A1 | 10/2016 | Nammoto et al. | |
| 2021/0331327 A1* | 10/2021 | Lee | B25J 15/0253 |
| 2021/0387328 A1* | 12/2021 | Hahn | B25J 9/08 |

* cited by examiner

ROBOT SYSTEM FOR AUTOMATED ASSEMBLY OF MODULAR COMPONENT

CROSS-REFERENCE TO RELATED APPLICATIONS

This application claims the benefit of priority to Korean Patent Application Nos. 10-2021-0109216, 10-2021-0109212, 10-2021-0110316 and 10-2021-0111155, which are filed on Aug. 19, 2021, Aug. 19, 2021, Aug. 20, 2021 and Aug. 23, 2021, respectively, the disclosure of which is incorporated herein by reference in their entirety.

BACKGROUND

1. Technical Field

The present disclosure relates to a robot system for automated assembly of a modular component.

2. Discussion of Related Art

The content described in this section merely provides background information on the present disclosure and does not constitute the prior art.

The smart factory field is being applied to the industry. In a smart factory, even parts of a product are assembled through automation using a robot. A robot for assembling a product is generally composed of a loading robot, an assembly robot, and a part providing robot. Here, the loading robot serves to grip a modular component, move the gripped modular component to an assembly position of an assembly target, and align the modular component with the assembly target. The assembly robot serves to assemble the modular component and the assemble target aligned by the loading robot. The parts supply robot serves to supply a part to be gripped by the loading robot from the outside.

Since a conventional automated assembly robot simply completes fastening of bolts temporarily assembled by a person, the development of full automation of assembly without human involvement continues.

SUMMARY

According to at least one aspect, the present disclosure provides a robot system for automatically assembling a modular component and an assembly target, comprising: an assembly robot including a first manipulator, an assembly tool coupled to the first manipulator and configured to assemble the modular component and the assembly target, and a first camera configured to capture images in a direction in which the assemble tool faces; a loading robot including a second manipulator and a gripper coupled to the second manipulator and configured to grip the modular component; and a control device configured to control the assembly robot and the loading robot.

DETAILED DESCRIPTION

Figure 1:
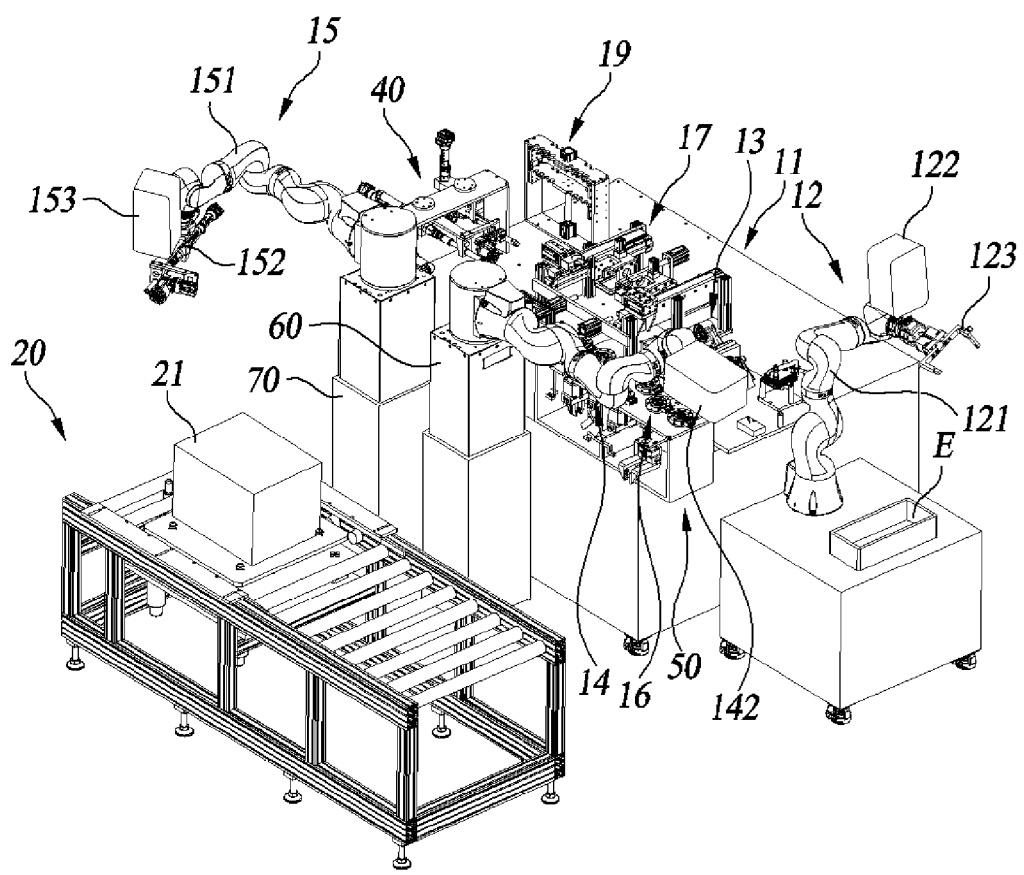
FIG. 1 is a perspective view of a part assembling system using collaborative robots according to an embodiment of the present disclosure.

An assembly system for automation of assembly of modular components according to an embodiment can automate a series of processes of gripping a modular component, moving the modular component to an assembly position, aligning the modular component, and assembling the modular component and an assembly target.

The problems to be solved by the present invention are not limited to the problems mentioned above, and other problems which are not mentioned will be clearly understood by those skilled in the art from the following description.

Hereinafter, some exemplary embodiments of the present disclosure will be described in detail with reference to the accompanying drawings. In the following description, like reference numerals preferably designate like elements, although the elements are shown in different drawings. Further, in the following description of some embodiments, a detailed description of known functions and configurations incorporated therein will be omitted for the purpose of clarity and for brevity.

Additionally, various terms such as first, second, A, B, (a), (b), etc., are used solely to differentiate one component from the other but not to imply or suggest the substances, order, or sequence of the components. Throughout this specification, when a part 'includes' or 'comprises' a component, the part is meant to further include other components, not to exclude thereof unless specifically stated to the contrary. The terms such as 'unit,' 'module,' and the like, refer to one or more units for processing at least one function or operation, which may be implemented by hardware, software, or a combination thereof.

Figure 2:
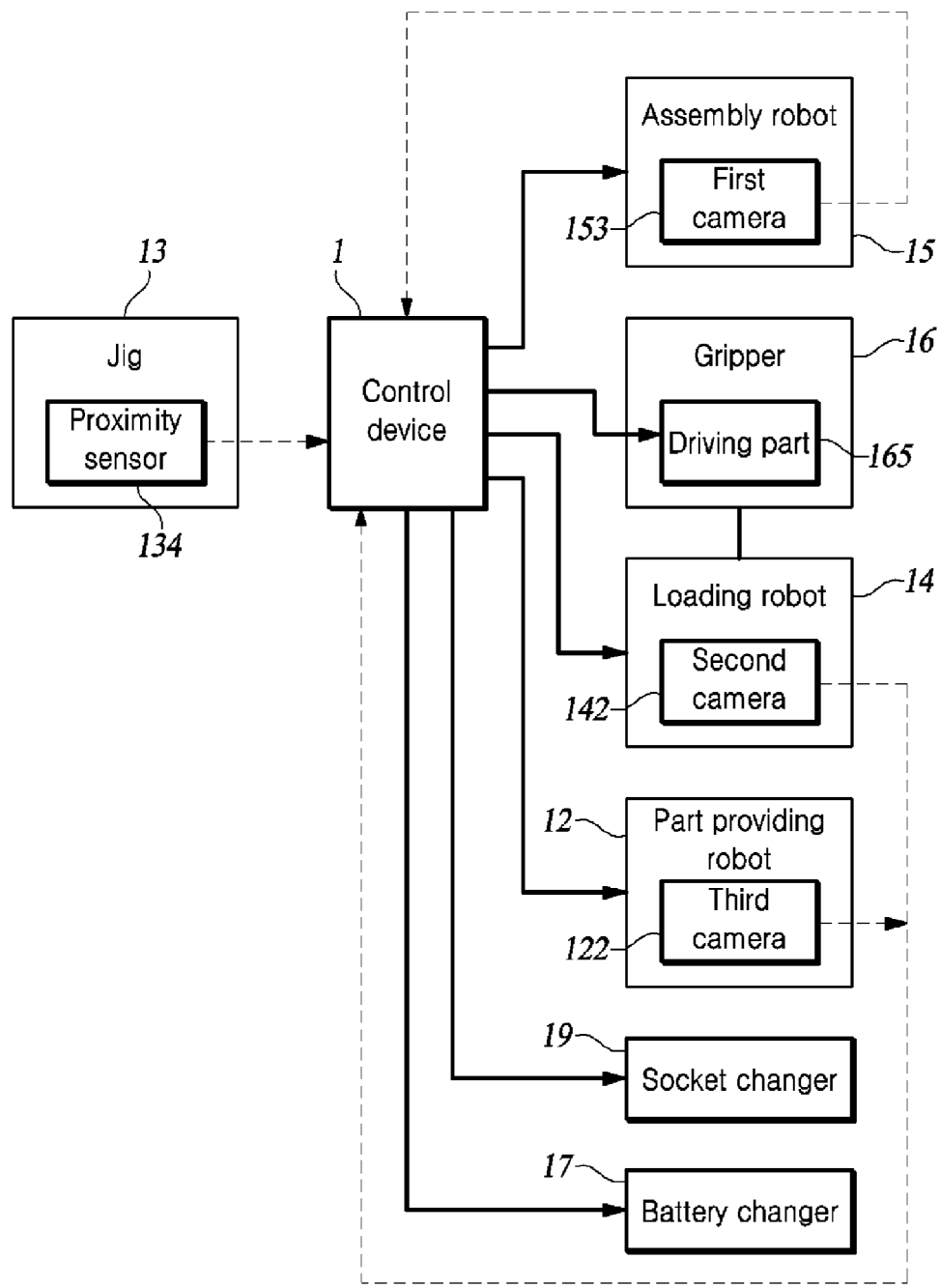
FIG. 2 is a block diagram of the part assembling system using collaborative robots according to an embodiment of the present disclosure.

FIG. 1 is a perspective view of a part assembling system using collaborative robots according to an embodiment of the present disclosure. FIG. 2 is a block diagram of the part assembling system using collaborative robots according to an embodiment of the present disclosure. Here, the collaborative robots include a loading robot 14 and an assembly robot 15.

The part assembling system 10 using collaborative robots includes all of some of a base 11, a part providing robot 12, a jig 13, the loading robot 14, the assembly robot 15, a battery changer 17, a socket changer 19, a gripper holder 50, an assembly tool holder 40, and a control device 1.

The control device 1 is configured to control overall operations of the loading robot 14, the assembly robot 15, the part providing robot 12, the socket changer 19, and the battery changer 17. The control device 1 may include a loading robot controller that controls the operation of the loading robot 14, an assembly robot controller that controls the operation of the assembly robot 15, and a part providing robot controller that controls the operation of the part providing robot 12. Although the controllers can be disposed adjacent to each other, the controllers may be disposed spaced apart from each other such that they are adjacent to the corresponding robots. The controllers may be controlled by the single control device 1.

The loading robot 14 grips a modular component 132 fixedly loaded on the jig 13, moves the modular component 132 to an assembly area where the modular component 132 will be assembled with an assembly target 21, and aligns the modular component 132. The assembly target 21 is moved by a device such as a conveyor belt 20 and disposed within the assembly area. Here, the assembly area is an area on the conveyor belt 20 within a moving radius of the loading robot 14 and the assembly robot 15 and refers to a position at which the modular component 132 can be assembled by the loading robot 14 and the assembly robot 15.

The loading robot 14 may include a second manipulator 141, a second camera 142, and a gripper 16. One end of the second manipulator 141 is connected to the gripper 16 and the other end is fixed to a rotation support 145.

The second manipulator 141 and the gripper 16 are configured to be separable from each other. The loading robot 14 may use different types of grippers 16 according to the shape of the modular component 132.

The gripper 16 is replaceable. At least one type of detachable gripper 16 is mounted on one end of the second manipulator 141 on the gripper holder 50. Depending on the shape of the modular component 132 to be gripped, the corresponding gripper 16 may be mounted on the loading robot 14. The gripper 16 is mounted at a mounting position determined according to the type of the gripper 16 on the gripper holder 50. The control device 1 may store information on each fixed mounting position according to the type of the gripper 16.

The second camera 142 is configured to capture an image in the direction toward the gripper 16. The second camera 142 provides a vision to the loading robot 14 such that the loading robot 14 can precisely grip the modular component 132 loaded on the jig 13. For example, the loading robot 14 may align the modular component 132 with the assembly target 21 based on vision information obtained from the second camera 142. In other words, the control of the loading robot 14 may be performed based on the vision information acquired using the same second camera 142 provided on the loading robot 14 in two different processes, for example, in a gripping process (refer to S320 in FIG. 9) and an alignment process (refer to S340 in FIG. 9).

Meanwhile, the second camera 142 may be omitted from the loading robot 14. In this case, the loading robot 14 may hold the modular component 132 on the jig 13 using position-based control rather than vision-based control. A control method when the second camera 142 is omitted will be described later.

A vertically movable and/or rotatable loading robot support 60 may be disposed below the loading robot 14. By disposing the loading robot support 60 under the loading robot 14, the operating radius of the loading robot 14 can be extended.

The assembly robot 15 assembles the assembly target 21 and the modular component 132. The assembly robot 15 may include a first manipulator 151, a first camera 153, and an assembly tool 152. One end of the first manipulator 151 is connected to the assembly tool 152.

The assembly robot 15 may align the assembly tool 152 in an assembly area using a vision provided by the first camera 153. The first camera 153 may be configured to capture an image in the direction in which the assembly tool 152 faces. The assembly robot 15 may assemble the assembly target 21 and the modular component 132 by driving the first manipulator 151 to move the assembly tool 152 to the assembly area.

The assembly tool 152 is replaceable. Various types of replaceable assembly tools 152 are disposed on the assembly tool holder 40. The control device 1 may mount an assembly tool 152 having a required shape on the assembly robot 15 according to circumstances. The assembly tool 152 is mounted at a position determined according to the type thereof on the assembly tool holder 40. The control device 1 may store information on a unique position of the assembly tool 152 determined according to the type thereof.

A vertically movable and/or rotatable assembly robot holder 70 may be disposed under the assembly robot 15. By disposing the assembly robot support 70 under the assembly robot 15, the operating radius of the assembly robot 15 can be extended.

The loading robot 14 is controlled by the loading robot controller. In order to assemble the modular component 132 and the assembly target 21, the loading robot controller controls a process of gripping the modular component 132 loaded on the jig 13 and moving the modular component 132 to an assembly area using position-based control. The loading robot 14 can move the modular component 132 on the jig 13 to the assembly area more rapidly by performing position-based control without using a camera.

When the loading robot 14 moves the modular component 132 to the assembly area, the loading robot controller may perform control using the first camera 153 disposed on the assembly robot 15. In order to assemble the modular component 132 and the assembly target 21, the modular component 132 needs to be aligned at a correct position in a correct direction. To this end, the modular component 132 is aligned using the first camera 153 of the assembly robot 15. At this time, the assembly robot 15 is driven such that the first camera 153 can provide a vision on the assembly target side.

After the loading robot 14 moves the modular component 132 to the assembly area, the assembly robot controller performs control for assembling the modular component 132 and the assembly target 21 using the first camera 153 disposed on the assembly robot 15.

The loading robot 14 is positioned in a first intermediate area spaced apart from the driving radius of the part providing robot 12 such that the loading robot 14 does not physically interfere with the operation of the part providing robot 12 before being driven by the loading robot controller. Here, the first intermediate area refers to an area present between an assembly area and an area where the loading robot 14 grips the modular component 132 in the driving range of the loading robot 14.

After the loading robot 14 moves the modular component 132 to the assembly area, the assembly robot controller performs control for assembling the modular component 132 and the assembly target 21 using the first camera 153 disposed on the assembly robot 15.

The part providing robot 12 receives the modular component 132 from the outside and positions the modular component 132 at a predetermined position on the jig 13. The part providing robot 12 may include a third manipulator 121, a third camera 122, and a supply gripper 123. The supply gripper 123 is disposed at one end of the third manipulator 121. The part providing robot 12 grips the modular component 132 in a supply part E using the supply gripper 123 and positions the modular component 132 at a predetermined position on the jig 13. The part providing robot 12 may grip the modular component 132 in the supply part E using a vision of the third camera 122.

Figure 3:
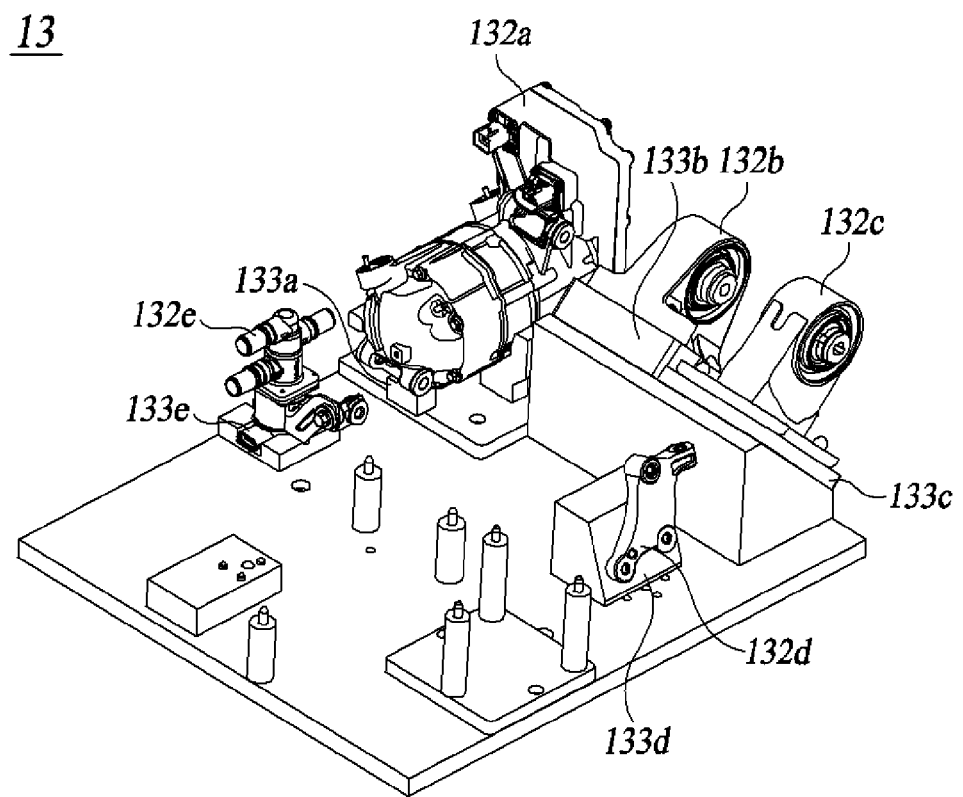
FIG. 3 is a perspective view of a jig shown in FIG. 1 according to an embodiment of the present disclosure.

FIG. 3 is a perspective view of the jig shown in FIG. 1 according to an embodiment of the present disclosure.

The modular component 132 is positioned at a predetermined position on the jig 13. As shown in FIG. 3, various types of modular components 132 in various shapes may be assembled with the assembly target 21. The shapes of modular components 132 shown in FIG. 3 are exemplary and are not limited thereto.

The jig 13 is formed to match the shape of each modular component 132 such that first to fifth modular components 132a to 132e can be placed at designated positions. That is, the jig 13 is formed such that the modular components 132 are disposed at different predetermined positions according to the shapes thereof. The first modular component 132a is disposed at a first position 133a, the second modular component 132b is disposed at a second position 133b, the third modular component 132c is disposed at a third position 133c, the fourth modular component 132d is disposed at a fourth position 133d, and the fifth modular component 132e is disposed at a fifth position 133e. When the loading robot 14 is not equipped with the second camera 142 and position-based control is performed, the loading robot 14 can grip a desired modular component 132 at a desired angle at a predetermined position according to the aforementioned features of the jig 13.

Information on positions at which the loading robot 14 grips the first to fifth modular components 132a to 132e using position-based control may be stored in the control device 1 in advance.

The jig 13 may include a proximity sensor 134 for detecting whether the modular components 132 are loaded on the jig 13. A plurality of proximity sensors 134 may be respectively disposed at the first position 133a to the fifth position 133e. The control device 1 may determine whether the modular components 132 are loaded at predetermined positions on the jig 13 by receiving detection signals from the proximity sensors 134.

Figure 4:
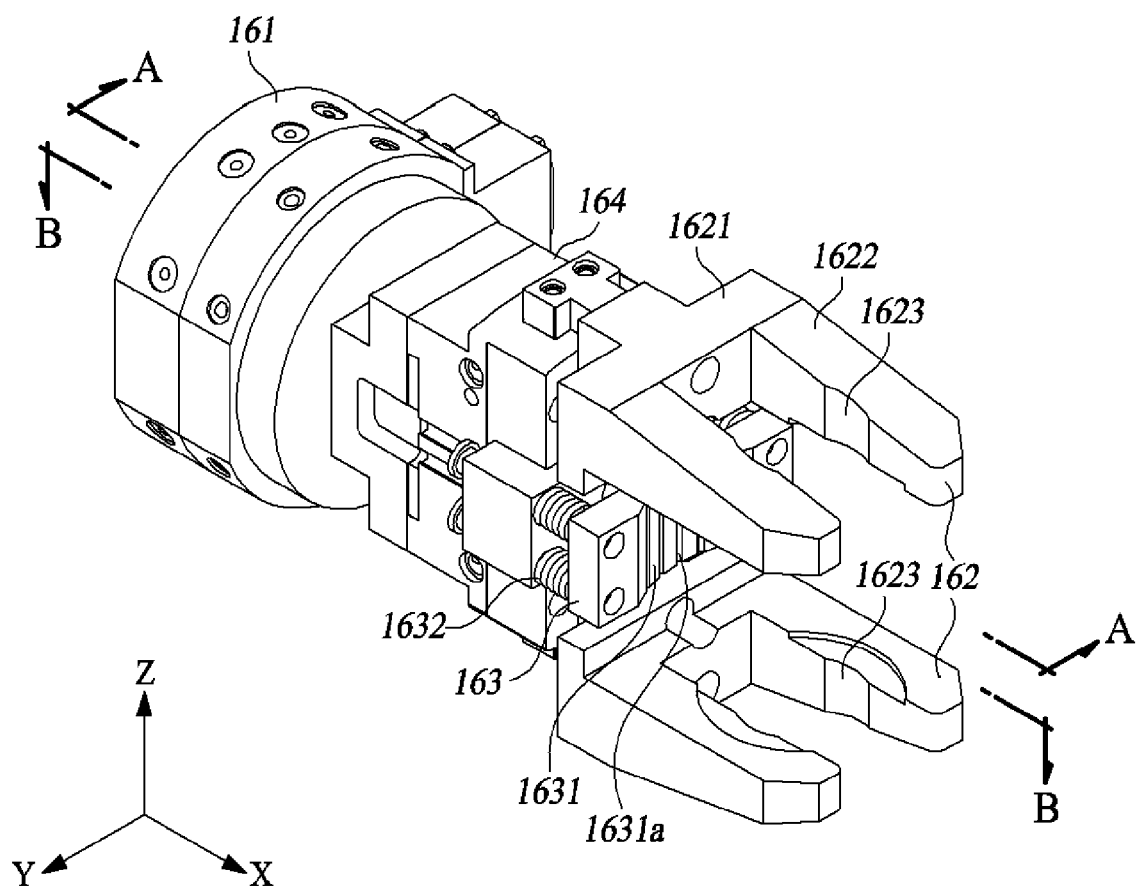
FIG. 4 is a perspective view of a gripper connected to an end of a loading robot shown in FIG. 1 according to an embodiment of the present disclosure.
Figure 5:
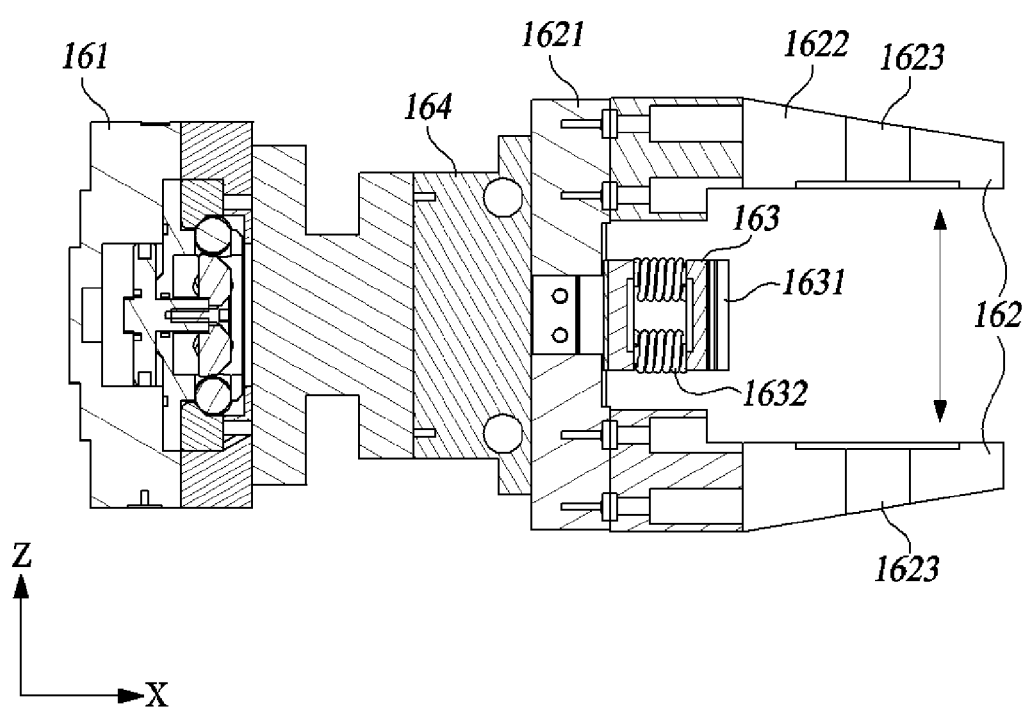
FIG. 5 is a cross-sectional view taken along line A-A of FIG. 4.
Figure 6:
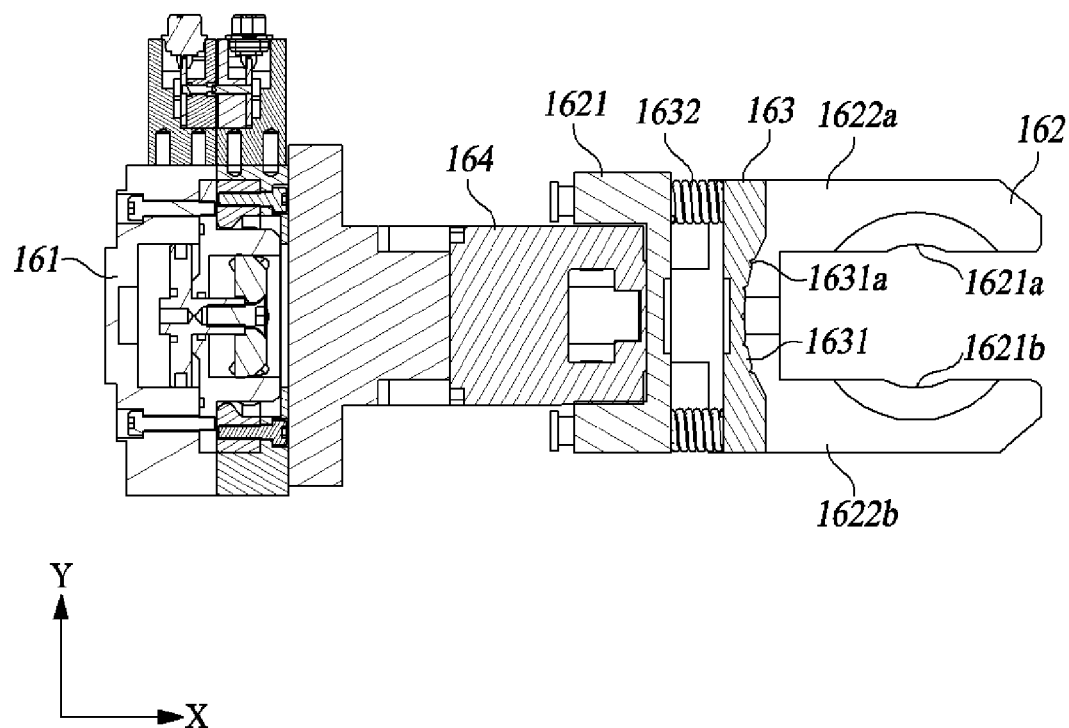
FIG. 6 is a cross-sectional view taken along line B-B of FIG. 4.

FIG. 4 is a perspective view of a gripper connected to an end of the loading robot shown in FIG. 1 according to an embodiment of the present disclosure, and FIG. 5 is a cross-sectional view taken along line A-A of FIG. 4. FIG. 6 is a cross-sectional view taken along line B-B of FIG. 4. The gripper shown in FIGS. 4 to 6 is used to grip the modular components 132b and 132c of various shapes (e.g., circle) in the present disclosure, and grippers having other shapes may be connected to the end of the second manipulator 141. Hereinafter, a case in which a cross section corresponding to a surface of the modular component 132b or 132 in contact with the gripper is circular will be exemplified.

Here, the circular modular component 132b or 132c may have a cylindrical shape or a spherical shape, but is not limited thereto. The circular modular component may have any shape as long as a portion thereof corresponding to a grip finger 162 when the gripper 16 grips the modular component has a predetermined radius of curvature. The circular module component 132b or 132c shown in FIG. 1 is exemplify and is not limited thereto.

Referring to FIGS. 4 to 6, the gripper 16 may include a robot connector 161, the grip finger 162, an elastic pressure part 163, and a driving part 165.

The grip finger 162 may include a gripping part 1622. The gripper 16 includes two grip fingers 162, and the two grip fingers 162 may be configured to be symmetrical with respect to the X-Z plane positioned at the center of the gripper 16.

Specifically, the grip fingers 162 may include a support part 1621 in contact with a body 164 and receiving power from the driving part 165, a first gripping part 1622a extending in the longitudinal direction of the body 164 from one end of the support part 1621 and having a first gripping groove 1621a, and a second gripping part 1622b extending in the longitudinal direction of the body 164 from the other end of the support part 1621 and having a second gripping groove 1621b. Here, the longitudinal direction of the body 164 refers to the X-axis direction of FIG. 4. The first gripping groove 1621a and the second gripping groove 1621b may have the same radius of curvature.

A gripping groove 1621 may be formed in the gripping part 1622. For example, the shape of the gripping groove 1621 may correspond to the shape of a portion of the circular modular component 132b or 132c in contact with the grip finger 162. For example, each of the first gripping grooves 1621*a* and the second gripping grooves 1622*a* may have a predetermined radius of curvature.

The elastic pressure part 163 is disposed adjacent to one end of the body 164 between the two grip fingers 162. The elastic pressure unit 163 may include a plurality of elastic members 1632 and a pressing plate. Here, the elastic members 1632 may be springs.

The plurality of elastic members 1632 may be disposed such that one end of each elastic member is in contact with the body 164 of the gripper 16 and the other end is in contact with one surface of the pressing plate. When the elastic pressure part 163 is pressed toward the body 164 of the gripper 16, the plurality of elastic members 1632 provides elastic force in the opposite direction of the body 164.

The pressing plate may be coupled to one end of each elastic member 1632 and configured to press the circular modular component 132*b* or 132*c*. For example, the pressing plate may have a pressure groove 1631 having a specific shape (e.g., an arc shape, a triangle, a square, etc.). The shape of the pressure groove 1631 may have an arc shape corresponding to the shape of a portion of the circular modular component 132*b* or 132*c* in contact with the elastic pressure part 163. Specifically, the shape of the pressure groove 1631 may correspond to the shape of the portion in contact with the pressing plate of the elastic pressure part 163. For example, as shown in FIG. 3, when the diameter of the central part of the circular modular component 132*b* or 132*c* is greater than the diameter of the edge thereof, the radius of curvature of the pressure groove 1631 may be greater than the radius of curvature of the gripping grooves 1621*a* and 1621*b*.

The pressure groove 1631 are formed to be spaced apart from the grip fingers 162 by a predetermined distance in the height direction of the grip fingers 162, and a plurality of line grooves 1631*a* extends in a direction perpendicular to the height direction of the grip fingers 162. Here, the height direction of the grip fingers 162 refers to the Y-axis direction in FIG. 4 and the direction perpendicular to the height direction of the grip fingers 162 refers to the Z-axis direction in FIG. 4. According to the above-described line groove 1631*a*, the gripping force of the grip fingers 162 can be further improved to prevent misalignment of a modular component due to slipping of the modular component during transport and/or assembly processes.

When the gripper 16 grips the circular modular component 132*b* or 132*c*, the elastic pressure part 163 is pressed against the body 164 in partial contact with the circular modular component 132*b* or 132*c*. At this time, the pressing plate presses the circular modular component 132*b* or 132*c* by the elastic force of the elastic pressure part 163. The circular modular component 132*b* or 132*c* may be fixed in the gripper 16 without rotating according to pressing.

The robot connector 161 is disposed on one end of the gripper 16 adjacent to the other end of the body 164 and connected to the loading robot 14. One end of the second manipulator 141 of the loading robot 14 is connectable to the robot connector 161.

The driving part 165 is disposed in the body 164 to move the two grip fingers 162. The driving part 165 may move the two grip fingers 162 away from or closer to each other in the outward direction of the body 164. For example, as shown in FIG. 5, the two grip fingers may move away from or closer to each other in the Z-axis direction.

Before the gripper 16 grips the circular modular component 132*b* or 132*c*, the loading robot controller controls the driving part 165 to increase the distance between the two grip fingers 162. When the gripper 16 grips the circular modular component 132*b* or 132*c*, the loading robot controller controls the driving part 165 such that the two grip fingers 162 become close to each other. When the circular modular component 132*b* or 132*c* is mounted on and fixed to the gripping grooves 1621 of the gripper 16, the circular modular component 132*b* or 132*c* presses the elastic pressure part 163 such that rotation is also fixed.

Figure 7:
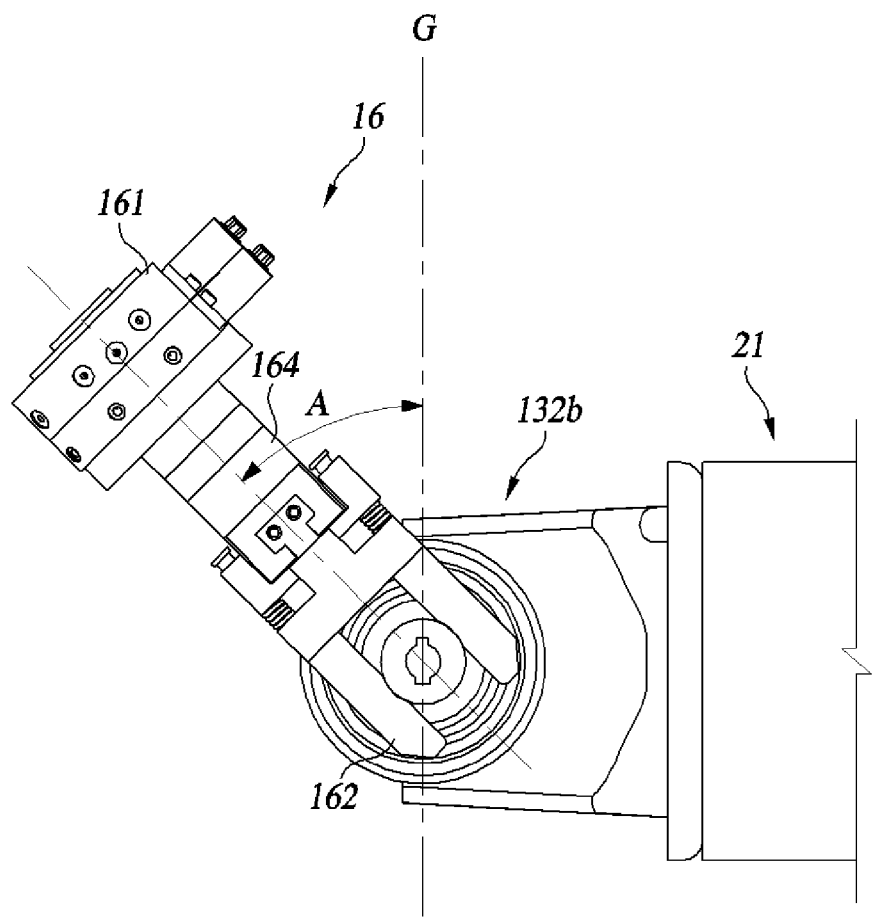
FIG. 7 is a side view illustrating a state in which the gripper grips a circular modular component.

FIG. 7 is a side view illustrating a state in which the gripper grips a circular modular component.

When the gripper 16 grips the circular modular component 132*b* or 132*c*, the gripper 16 may grip the circular modular component 132*b* or 132*c* in a diagonal direction at a predetermined angle A with respect to the gravitational direction G of the circular modular component 132*b* or 132*c*. According to this structure, a sufficient space in which the assembly robot 15 can perform an assembling operation without being interfered by the loading robot 14 can be secured, as shown in FIG. 7, and thus the assembling operation can be smoothly performed. Therefore, it is possible to perform the assembling operation using assembly tools in various shapes without manufacturing the assembly tool of the assembly robot 15 in a specific shape in order to avoid interference of surrounding structures.

Among the collaborative robots, the loading robot 14 may be equipped with the gripper shown in FIGS. 4 to 6, grip the circular modular components 132*b* and 132*c*, move to an assembly area and fix the modular components 132*b* and 132*c*. Among the collaborative robots, the assembly robot 15 may assemble the circular modular components 132*b* and 132*c* fixed by the loading robot 14.

Figure 8:
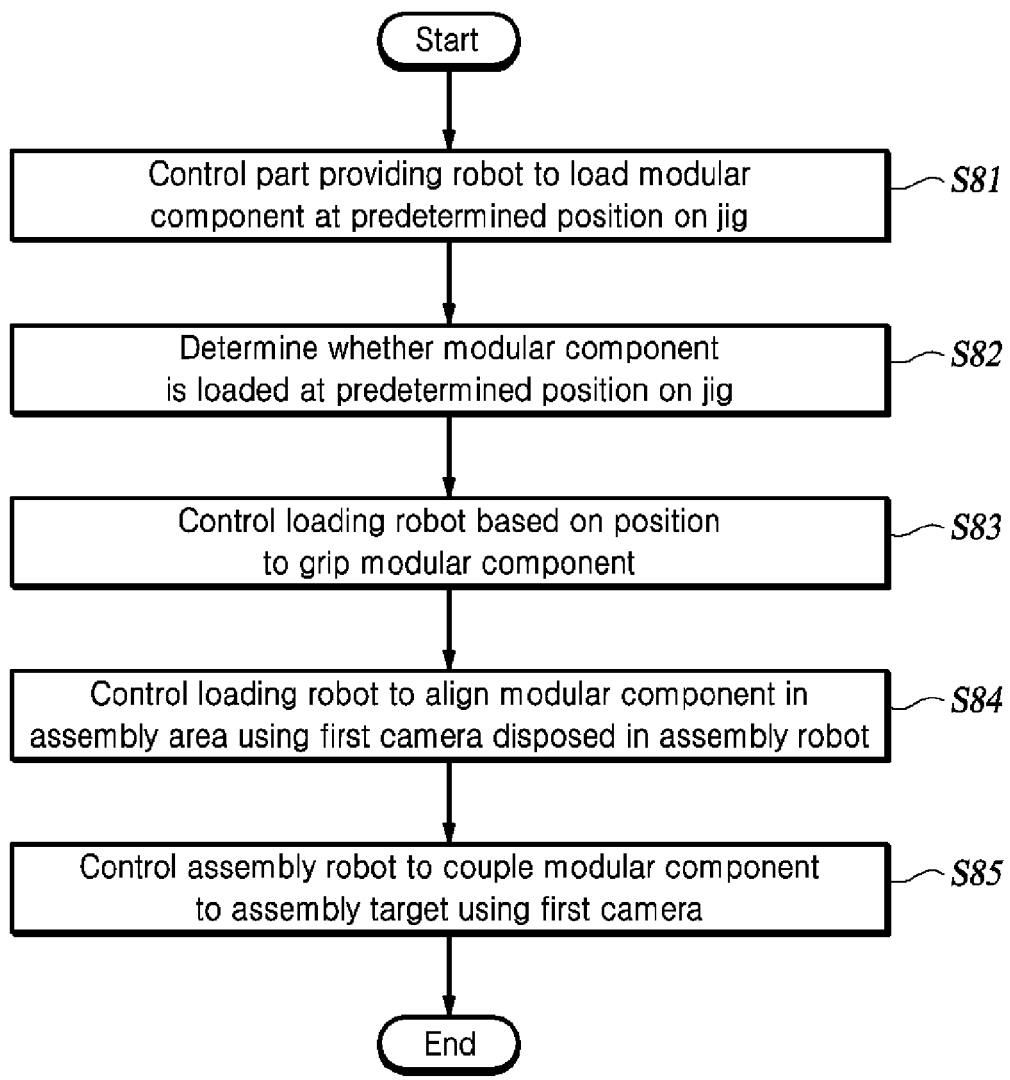
FIGS. 8 and 9 are flowcharts of a method for assembling parts using collaborative robots according to an embodiment of the present disclosure.
Figure 9:
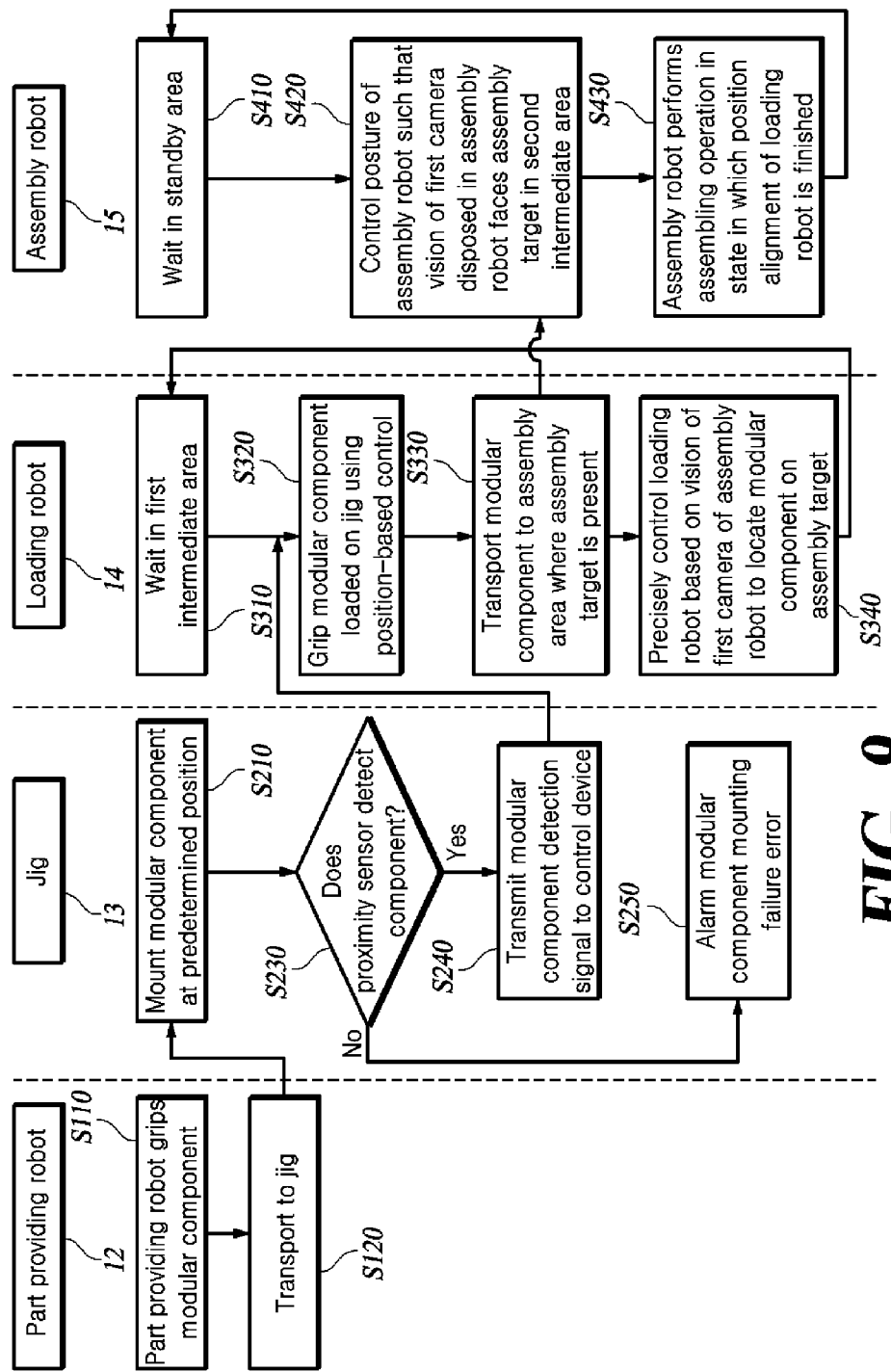

FIGS. 8 and 9 are flowcharts of a method for assembling parts using collaborative robots according to an embodiment of the present disclosure.

The flowchart shown in FIG. 8 shows one of control processes from gripping a modular component 132 to assembling it with the assembly target 21.

The part providing robot 12 loads the modular component 132 at a predetermined position on the jig 13 under the control of the control device 1 (S81). For example, the part providing robot 12 loads the first modular component 132*a* at the first position 133*a*, as shown in FIG. 3.

The control device 1 determines whether the modular component 132 is loaded at a predetermined position on the jig 13 (S82). The proximity sensor 134 capable of detecting whether the modular component 132 is loaded at a predetermined position may be included in the jig 13 or provided around the jig 13. The control device 1 may receive a detection signal from the proximity sensor 134 and determine whether the modular component 132 is loaded at a predetermined position on the jig 13.

Upon determining that the modular component 132 is loaded at the predetermined position on the jig 13, the control device 1 performs position-based control on the loading robot 14 such that the loading robot 14 grips the modular component 132 (S83). Here, position-based control refers to control of gripping the modular component 132 on the basis of position information on a grip position of each modular component 132, which is stored in advance without using a vision of a camera. This is merely an example, and the loading robot 14 may grip and transfer the modular component 132 based on the vision of the second camera 142.

After the loading robot 14 grips the modular component 132, the loading robot 14 operates to align the modular component 132 in an assembly area using the first camera 153 disposed on the assembly robot 15 under the control of the control device 1 (S84). The control device 1 controls movement of the assembly robot 15 such that the first camera 153 mounted on the assembly robot 15 provides a vision on the side of the assembly area. For example, the first camera 153 may be or include (i) a 3D vision camera capable of capturing a stereoscopic image, or (ii) a 2.5D vision camera having a depth recognition function in addition to a 2D image. According to this configuration, it is possible to obtain sufficient information necessary for a loading operation and/or an assembling operation without moving the assembly robot 15 in order to adjust the line of sight of the first camera 153.

After the modular component 132 is aligned in the assembly area, the control device 1 controls the assembly robot such that the modular component 132 and the assembly target 21 are assembled using the vision of the first camera 153 (S85). According to this operation, it is possible to reduce the manufacturing cost and efforts required for maintenance by reducing the total number of cameras.

FIG. 9 is a flowchart illustrating a process of controlling each component in an operating process of a part assembly system using collaborative robots.

Referring to FIG. 9, the control device 1 may repeatedly perform S110 and S120 for the part providing robot 12, S210 and S230 to S250 for the jig 13, S310 to S340 for the loading robot 14, and S410 to S430 for the assembly robot 15. Hereinafter, the control device 1 will be divided into a part providing robot controller, a loading robot controller, and an assembly robot controller and respectively described.

The part providing robot controller controls the part providing robot 12 such that it grips the modular component 132 from the outside (S110). After the part providing robot 12 grips the modular component 132 from the outside, the part providing robot controller controls the modular component 132 to be transferred to the jig 13 (S120).

The part providing robot controller controls the part providing robot 12 such that the part providing robot 12 mounts the modular component arts 132 transferred to the jig 13 at a predetermined position on the jig 13 (S210). Thereafter, it is determined whether the modular component 132 has been detected using the proximity sensor 134 (S230). When the proximity sensor 134 does not detect the modular component 132, a modular component misplacement error is alerted (S250). When the proximity sensor 134 detects the modular component 132, the detection signal of the proximity sensor 134 is transmitted to the loading robot controller (S240).

Before the modular component detection signal is received, the loading robot controller controls the loading robot 14 such that it waits in a first intermediate area (S310). Here, the first intermediate area means an area present between the assembly area and an area in which the loading robot 14 grips the modular component 132 in a driving range of the loading robot 14.

After the loading robot controller receives the modular component detection signal, the loading robot controller controls the loading robot 14 such that the loading robot 14 grips the modular component 132 loaded on the jig 13 using position-based control (S320). After the loading robot 14 grips the modular component 132, the loading robot controller controls the loading robot 14 such that the loading robot 14 transfers the modular component 132 to the assembly area where the assembly target 21 is present (S330).

When the modular component 132 is moved to the assembly area, the loading robot controller transmits an assembly signal to the assembly robot controller.

The assembly robot controller controls the assembly robot 15 to wait in a waiting area before the assembly signal is received (S410). Here, the waiting area means an area where the assembly robot 15 does not interfere with the driving radius of the loading robot 14 when the assembly robot 15 does not operate.

When the assembly robot controller receives the assembly signal, the assembly robot controller moves the assembly robot 15 to a second intermediate area and controls the posture of the assembly robot 15 such that the vision of the first camera 153 disposed on the assembly robot 15 faces the assembly target 21 (S420). Here, the second intermediate area within the driving range of the assembly robot 15 means an area between the waiting area and the assembly area.

Based on the vision of the first camera of the assembly robot 15 after the process S420, the loading robot controller positions the modular component 132 on the assembly target 21 by precisely controlling the loading robot 14 (S440).

In a state in which the module part 132 is positioned on the assembly target 21 and thus position alignment of the loading robot 14 is finished, the assembly robot controller controls the assembly robot 15 to perform the assembling operation (S430).

For example, in the processes S340 and S430, the assembly robot 15 may fasten at least one of a plurality of assembly parts connecting the modular component 132 and the assembly target 21 in a state in which the loading robot 14 has aligned the modular component 132 with the assembly target 21. For example, in a state in which the assembly robot 15 has fastened only some of the plurality of assembly parts (partial assembly process), the loading robot 14 retracts from the assembly area (retracting process), and the assembly robot 15 may fasten the remaining parts (remaining assembly process). According to this configuration and process, it is possible to efficiently secure a space for the assembling operation of the assembly robot 15.

For example, while the alignment process S340 and/or the assembling process S430 are performed, the loading process S210 is performed, and the gripping process S320 is immediately performed after the alignment process S340 by skipping the waiting process (S310), and thus the time required for the waiting process S310 can be reduced.

Figure 10:
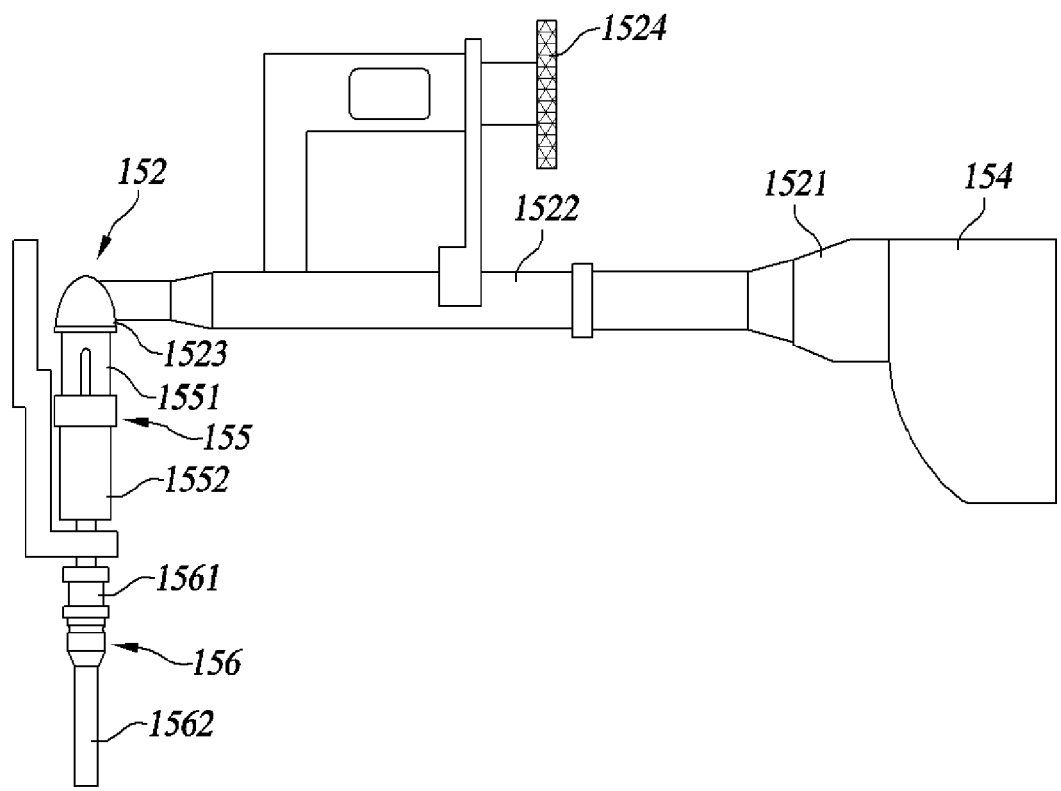
FIG. 10 is a side view of an assembly tool according to an embodiment of the present disclosure.

FIG. 10 is a side view of an assembly tool according to an embodiment of the present disclosure.

Referring to FIG. 10, the assembly tool 152 includes all or some of an assembly robot coupling part 1524, a nut runner 1522, a telescoper 155, a battery 154, and a socket 156.

The assembly tool 152 is coupled to a free end of the assembly robot 15 and includes the assembly robot coupling part 1524 for being coupled to the assembly robot 15. The assembly robot coupling part 1524 may include a connection terminal provided to be electrically connected to the assembly robot 15 and a pneumatic connector provided to receive air pressure from the assembly robot 15.

The nut runner 1522 is provided with an output shaft at the end. A bolt may be inserted into the assembly target 21 by rotating a socket directly or indirectly coupled to the output shaft while the output shaft rotates. The nut runner 1522 is a device for quickly tightening or loosening a bolt or a nut using electric power or compressed air. When the battery 154 is mounted on one end of the nut runner 1522, the nut runner 1522 may be driven in a wireless manner. The output shaft may be rotated by rotating a motor inside the nut runner 1522 by power supplied from the battery 154. The battery 154 mounted on one end of the nut runner 1522 may be automatically replaced using a battery changer 17 (refer to FIG. 17). The battery changer 17 will be described in detail with reference to FIGS. 17 to 22.

The nut runner 1522 may be of a straight type or an angle type, but is not limited thereto. The nut runner 1522 of the assembly tool 152 shown in FIG. 10 is an angle-type nut runner 1522. In the case of a linear type, the axis of rotation of the output shaft is formed to be parallel to the longitudinal direction of the nut runner 1522.

The telescoper 155 is configured such that one end thereof is connected to the output shaft and the length is variable. A replaceable socket 156 may be mounted at the other end of the telescoper 155. That is, the telescoper 155 may be disposed between the socket 156 and the nut runner 1522.

The socket 156 includes a bolt insertion groove 1562a into which the head of a bolt is inserted, which is provided at one end of the socket 156 and a socket insertion groove 1552b in which the telescoper 155 or the output shaft is mounted, which is provided at the other end. One of several types of sockets 156 may be mounted on the assembly tool 152. The various types of sockets 156 may be sockets 156 having lengths such as 50 mm, 80 mm, 100 mm, 120 mm, and 200 mm. Accordingly, the control device 1 can replace the socket 156 with a socket 156 having an appropriate length as necessary and assembly the modular component 132 with the assembly target 21.

The bolt insertion groove 1562a may have various diameters depending on a bolt type. For example, when bolts with heads having diameters of 8 mm, 10 mm, 12 mm, 14 mm, and 17 mm are used, the bolt insertion groove 1562a of the socket 156 may have various sizes corresponding to the sizes of the heads of the bolts.

Figure 11:
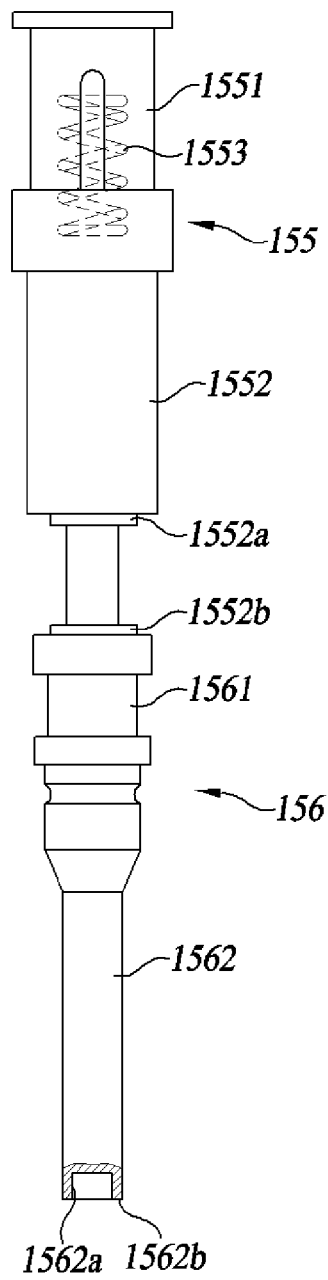
FIG. 11 is a cross-sectional view of a telescoper of FIG. 10.

FIG. 11 is a cross-sectional view of the telescoper of FIG. 10.

Referring to FIG. 11, the telescoper 155 includes a first connecting member 1552, an elastic member 1553, and a second connecting member 1551.

The first connecting member 1552 has one open end and a hollow penetrating at least a portion thereof, and includes a socket insertion part 1552a connected to the socket 156 and provided at the other end of the first connecting member 1552. The socket insertion part 1552a has a polygonal prism shape. The socket insertion part 1552a is inserted into the socket insertion groove 1552b of the socket 156, and the shape of the socket insertion groove 1552b corresponds to the shape of the socket insertion part 1552a. For example, when the socket insertion part 1552a has a rectangular prism shape, the socket insertion groove 1552b may be formed in a rectangular prism shape in at least a portion of the socket 156.

At least a portion of the second connecting member 1551 is disposed in the hollow of the first connecting member 1552 and is connected to the output shaft of the nut runner 1522.

At least a portion of the elastic member 1553 is disposed in the hollow of the first connecting member 1552. One end of the elastic member 1553 is in contact with the first connecting member 1552 and the other end thereof is disposed in contact with the second connecting member 1551.

Figure 12A:
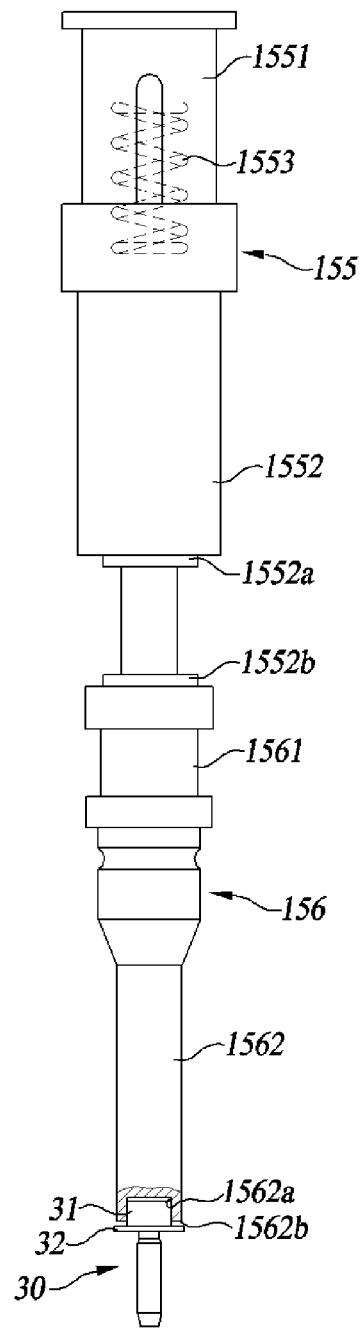
FIGS. 12A and 12B are views for describing a process in which an assembly tool is brought into surface contact with a bolt according to an embodiment of the present disclosure.
Figure 12B:
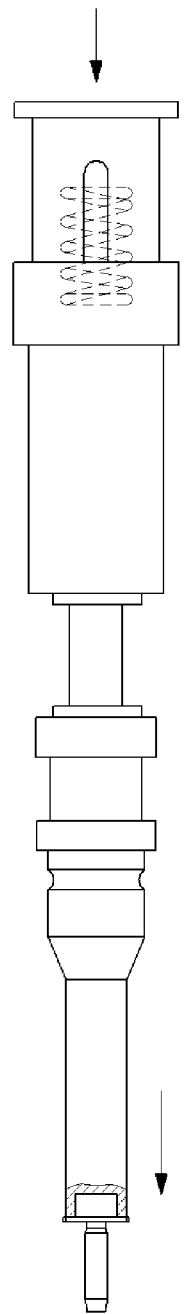

FIGS. 12A and 12B are views for describing a process in which the assembly tool is brought into surface contact with a bolt according to an embodiment of the present disclosure.

Referring to FIG. 12A, the control device 1 controls operations of the assembly robot 15 and the assembly tool 152 such that the head 31 of a bolt 30 to be fastened is inserted into the bolt insertion groove 1562a of the socket 156. When the nut runner 1522 is driven in a state in which the end face 1562b of the socket 156 is not brought into surface contact with a wing 32 of the bolt 30, the head 31 of the bolt 30 may be damaged or fastening failure may occur between the modular component 132 and the assembly target 21.

Accordingly, after the head 31 of the bolt 30 is inserted into the bolt insertion groove 1562a, the process shown in FIG. 12B is further performed to press the assembly tool 152 against the bolt 30 such that the wing 32 is brought into surface contact with the end face 1562b of the socket 156. In this case, the telescoper 155 may improve the surface contact state of the wing 32 of the bolt 30 and the end face 1562b of the socket 156.

The telescoper 155 is compressed when the control device 1 presses the assembly tool 152 against the bolt 30, and the elastic member 1553 therein may also be compressed to provide expansion force to the side of the bolt 30. Accordingly, the socket 156 may be effectively brought into close contact with the wing 32 of the bolt 30 by the expansion force of the elastic member 1553.

Figure 13:
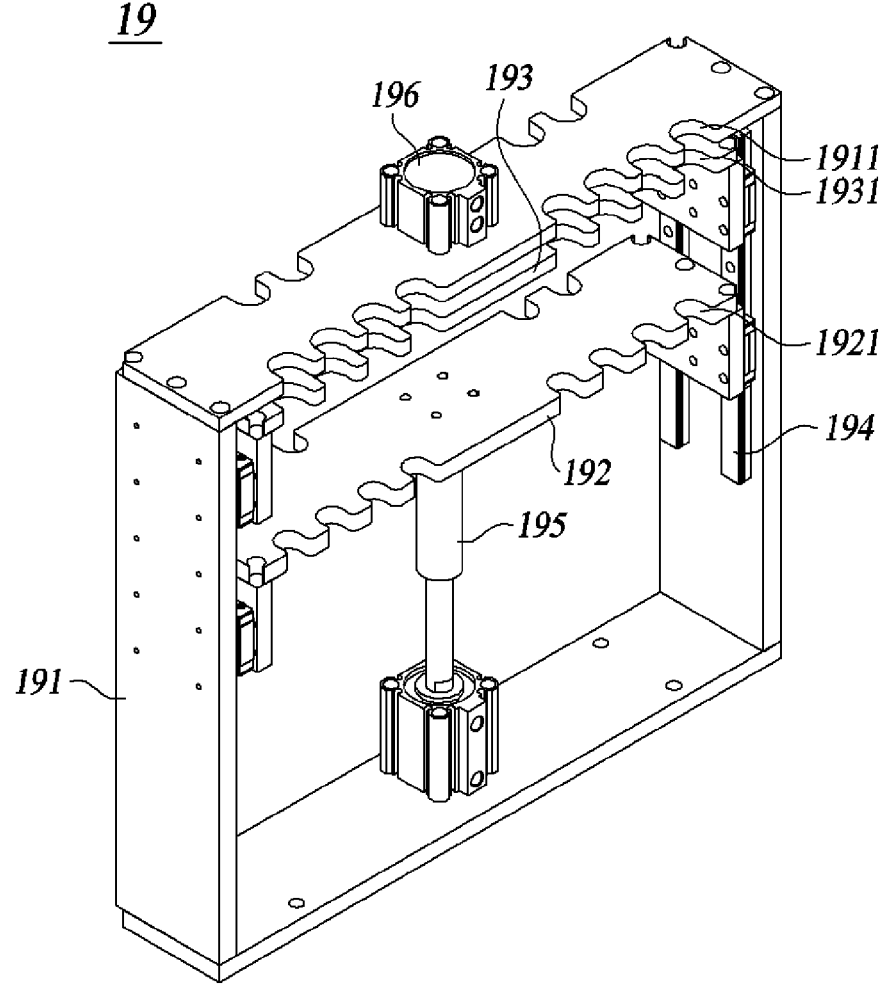
FIG. 13 is a perspective view of a socket changer according to an embodiment of the present disclosure.
Figure 14:
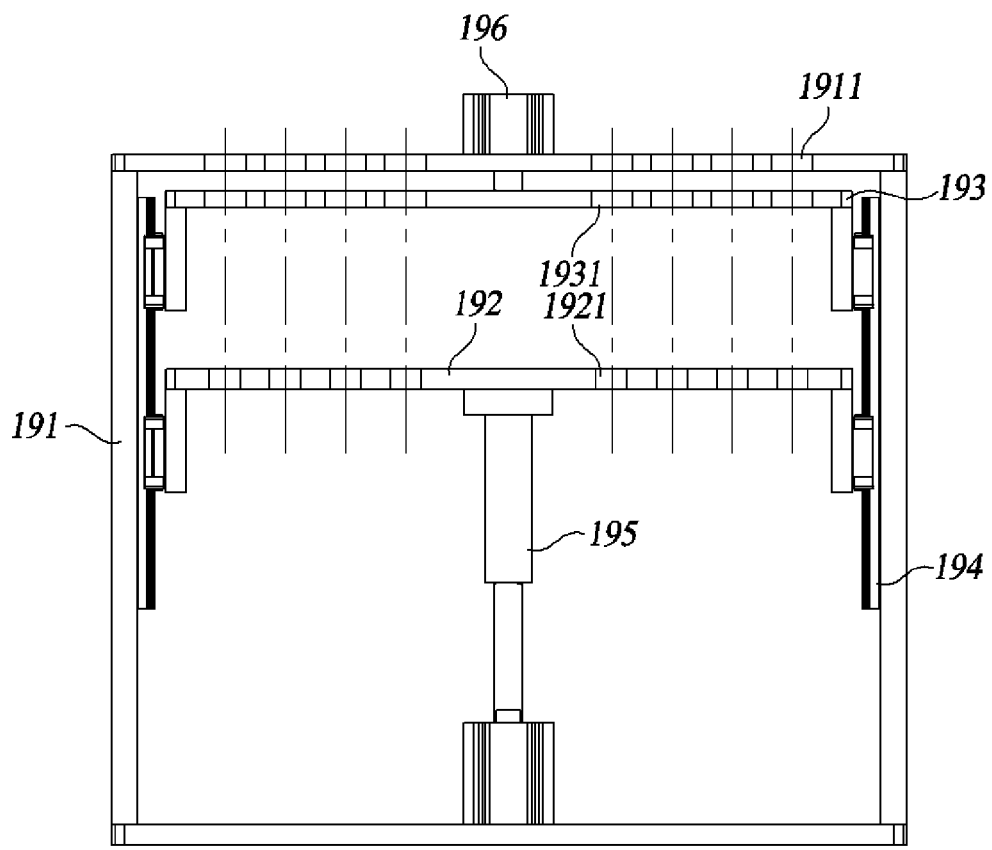
FIG. 14 is a front view of the socket changer according to an embodiment of the present disclosure.

FIG. 13 is a perspective view of a socket changer according to an embodiment of the present disclosure. FIG. 14 is a front view of the socket changer according to an embodiment of the present disclosure.

Referring to FIGS. 13 and 14, the socket changer 19 includes all or some of a socket changer frame 191, a socket detachable unit 192, a movement prevention unit 193, a guide rail 194, a first driving cylinder 195, and a second driving cylinder 196.

The socket changer frame 191 has a lower face, two side faces extending vertically upward from both ends of the lower face, and an upper face horizontally connecting the two side faces. The socket changer frame 191 includes a plurality of first engagement grooves 1911 on the upper surface. The first engagement grooves 1911 are grooves for fixing the movement of the assembly tool 152 when the assembly robot 15 mounts or detaches the socket of the assembly tool 152. A part of the telescoper 155 or a part of the nut runner 1522 of the assembly tool 152 may be caught by the first engagement grooves 1911 and thus the movement of the assembly tool 152 may be fixed.

The plurality of first engagement grooves 1911 may be formed at predetermined intervals and may have the same shape. The shape of the first engagement grooves 1911 may be a semicircular shape, but is not limited thereto.

The socket detachable unit 192 is disposed between both sides of the socket changer frame 191. The socket detachable unit 192 is provided such that it moves up and down in the socket changer frame 191. The guide rail 194 is disposed between the socket detachable unit 192 and both sides of the socket changer frame 191. The guide rails 194 are disposed on inner walls of both sides of the socket changer frame 191 to guide an ascending/descending path of the socket detachable unit 192.

The socket detachable unit 192 includes a plurality of second engagement grooves 1921. The socket 156 may include an engagement part 1561 corresponding to the shape of the second engagement grooves 1921. When the telescoper 155 or the nut runner 1522 is caught in the first engagement grooves 1911 in order for the assembly tool 152 to be separated from the socket 156, the engagement part 1561 of the socket 156 is caught in the second engagement grooves 1921.

The number of second engagement grooves 1921 may correspond to the number of first engagement grooves 1911. The first engagement grooves 1911 and the second engagement grooves 1921 may be arranged in a line in the vertical direction as shown in FIG. 14. The shape of the second engagement grooves 1921 may be a semicircular shape, but is not limited thereto.

The first driving cylinder 195 is provided to drive the socket detachable unit 192 in the vertical direction. The first driving cylinder 195 is provided to move the socket detachable unit 192 up and down between a first position and a second position lower than the first position.

A motor is provided in the first driving cylinder 195. The first driving cylinder 195 may move the socket detachable unit 192 in the vertical direction by converting the rotational motion of the motor into a linear motion. The first driving cylinder 195 may be in contact with a portion of the lower surface of the socket detachable unit 192 and may be configured to penetrate at least a portion of the lower surface of the socket changer frame 191.

After the assembly tool 152 is positioned in contact with the first engagement grooves 1911 and the second engagement grooves 1921 to separate the socket 156, the socket detachable unit 192 is moved from the first position to the second position. Accordingly, the socket 156 can be separated from the assembly tool 152. On the other hand, after the assembly tool 152 is positioned in contact with the first engagement grooves 1911 to mount the socket 156, the socket detachable unit 192 may be moved from the second position to the first position to mount the socket 156 in the assembly tool 152.

The movement prevention unit 193 is provided to prevent the telescope 155 from moving when the socket 156 is mounted/separated in a case where the assembly tool 152 further includes the telescoper 155 configured to have a variable length by including the elastic member 1553 (refer to FIGS. 11 and 12). The movement prevention unit 193 is disposed between the upper surface of the socket changer frame 191 and the socket detachable unit 192 and includes a plurality of third engagement grooves 1931.

The plurality of third engagement grooves 1931 are formed such that a portion of the upper portion of the telescoper 155 is caught therein. Specifically, in order to mount/separate the socket 156 in/from the assembly tool 152, the assembly tool 152 is moved to bring the second connecting member 1551 of the telescoper 155 into contact with the third engagement grooves 1931. Accordingly, the movement prevention unit 193 may press the first connecting member 1552 while descending to prevent the first connecting member 1552 from moving due to the elastic member 1553.

The plurality of third engagement grooves 1931 are disposed at predetermined intervals. The third engagement grooves 1931 may have a semicircular shape, but are not limited thereto. The first engagement grooves 1911, the second engagement grooves 1921, and the third engagement grooves 1931 are arranged in lines in the vertical direction.

The second driving cylinder 196 is provided to drive the movement prevention unit 193 in the vertical direction. The second driving cylinder 196 is provided with a motor and may move the movement prevention unit 193 in the vertical direction by converting the rotational motion of the motor into a linear motion. The second driving cylinder 196 may be in contact with a portion of the upper surface of the movement prevention unit 193 and may be configured to penetrate a portion of the upper surface of the socket changer frame 191.

FIGS. 15A to 15D are views for describing a process in which a socket mounted in the assembly tool is replaced by the socket changer. Hereinafter, a method of mounting/ separating a socket of the assembly tool 152 including the telescoper 155 will be described as a reference in FIGS. 15A to 15D.

Figure 15A:
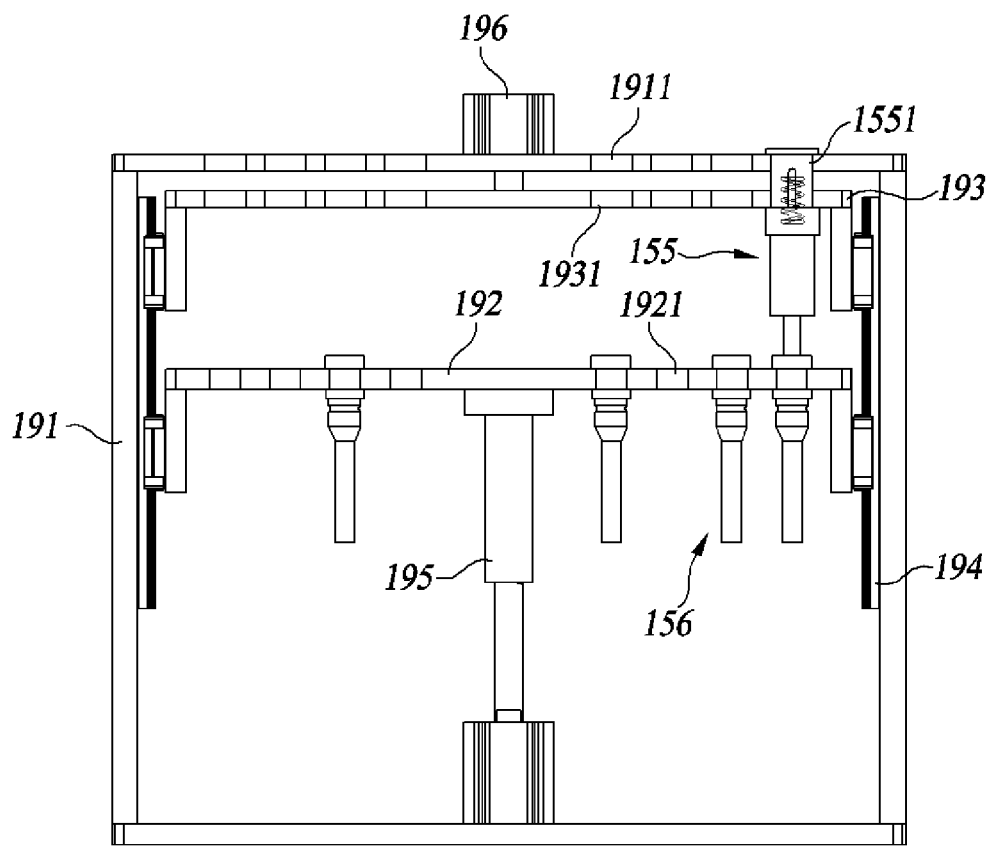
FIGS. 15A to 15D are views for describing a process in which a socket mounted in the assembly tool is changed by the socket changer.

FIG. 15A illustrates a process of moving the assembly tool 152 such that it is caught by the socket detachable unit 192 of the socket changer 19 in order to separate the socket 156 mounted in the assembly tool 152.

Referring to FIG. 15A, the control device 1 controls the assembly robot 15 and the assembly tool 152 such that the engagement part 1561 of the socket 156 mounted in the assembly tool 152 is moved to be in contact with a second engaging groove 1921. There are various types of sockets 156, and a unique location may be determined for each type. The control device 1 stores position data designated for each type of socket 156 and thus can determine a second engagement groove 1921 to which the socket 156 will be moved on the basis of the stored data.

As described above, since the first engagement grooves 1911, the second engagement grooves 1921, and the third engagement grooves 1931 are arranged in lines in the vertical direction, the nut runner 1522 or the telescoper 155 is caught in a first engagement groove 1911 and a portion of the upper part of the telescoper 155 is also caught in a third locking groove 1931 when the engagement part of the socket 156 mounted in the assembly tool 152 is caught in the second engagement groove 1921. Accordingly, the output shaft and the socket 156 are fixed in a line in the vertical direction.

Figure 15B:
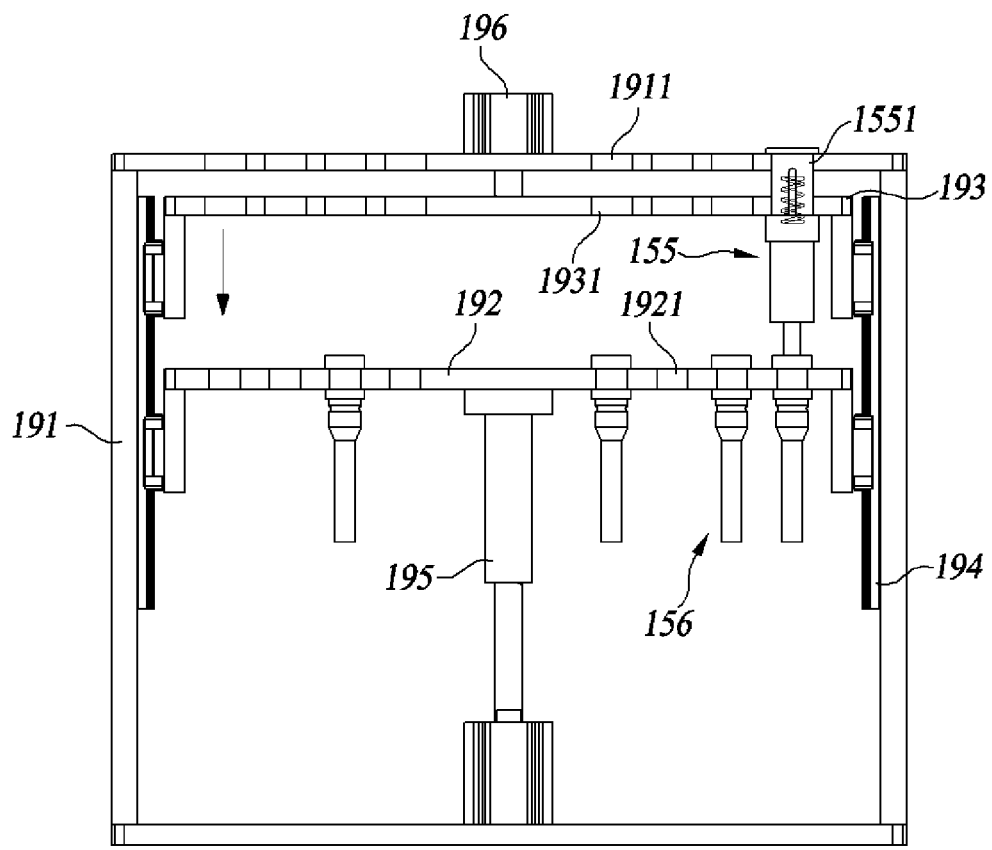

FIG. 15B illustrates a process of moving the movement prevention unit 193 downward to prevent the telescoper 155 from moving.

Referring to FIG. 15B, the control device 1 controls the second driving cylinder 196 to move the movement prevention unit 193 downward. When the movement prevention unit 193 is moved downward, the first connecting member 1552 of the telescoper 155 is pressed down. Accordingly, even if the elastic member 1553 disposed inside the first connecting member 1552 moves during mounting or separation of the socket 156, the first connecting member 1552 is fixed being pressed down. Therefore, when the socket detachable unit 192 in which the socket 156 is caught is moved, the socket 156 can be stably mounted in or separated from the assembly tool 152 without affecting the elastic member 1553.

Figure 15C:
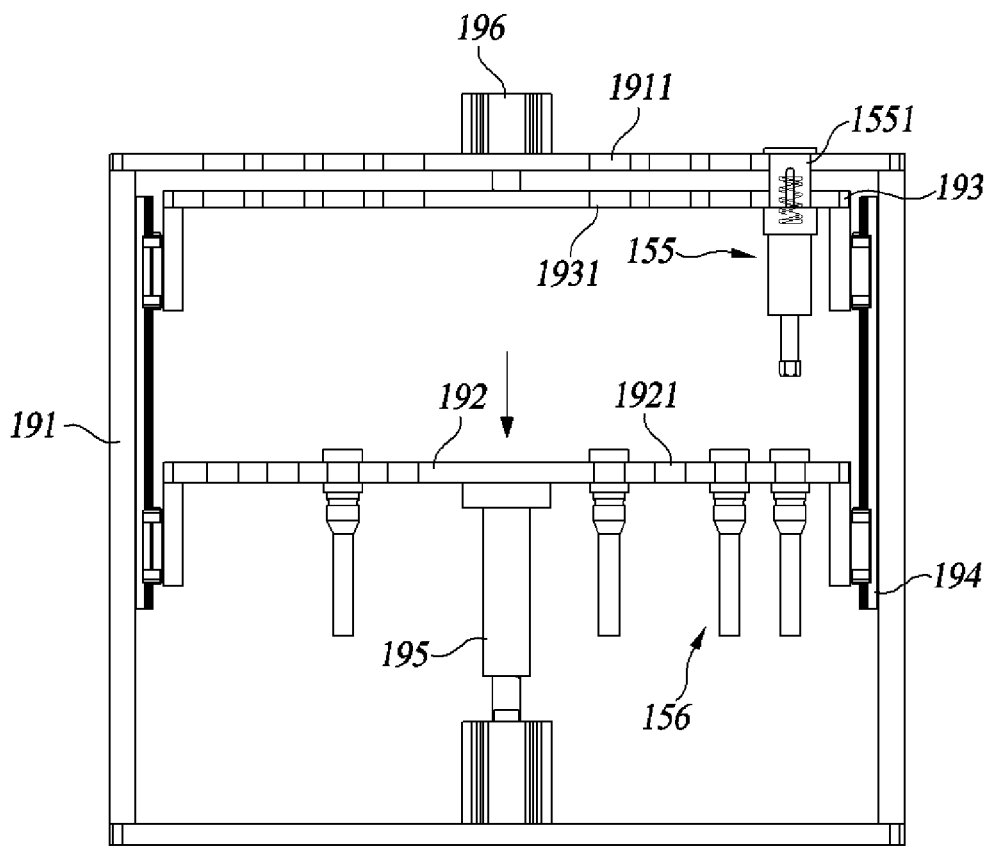

FIG. 15C illustrates a process of moving the socket detachable unit 192 downward to separate the socket 156 from the assembly tool 152.

Referring to FIG. 15C, the control device 1 controls the first driving cylinder 195 to move the socket detachable unit 192 downward. The socket 156 caught in the second engagement groove 1921 is moved down in a state in which the nut runner 1522 and the telescoper 155 are fixed by the first engagement groove 1911 and the third engagement groove 1931, and thus the assembly tool 152 and the socket 156 are separated from each other. After the socket 156 is separated from the assembly tool 152, the control device 1 controls the second driving cylinder 196 to move the movement prevention unit 193 upward, and then moves the assembly tool 152 to a position at which a socket 156 to be fastened is located.

Figure 15D:
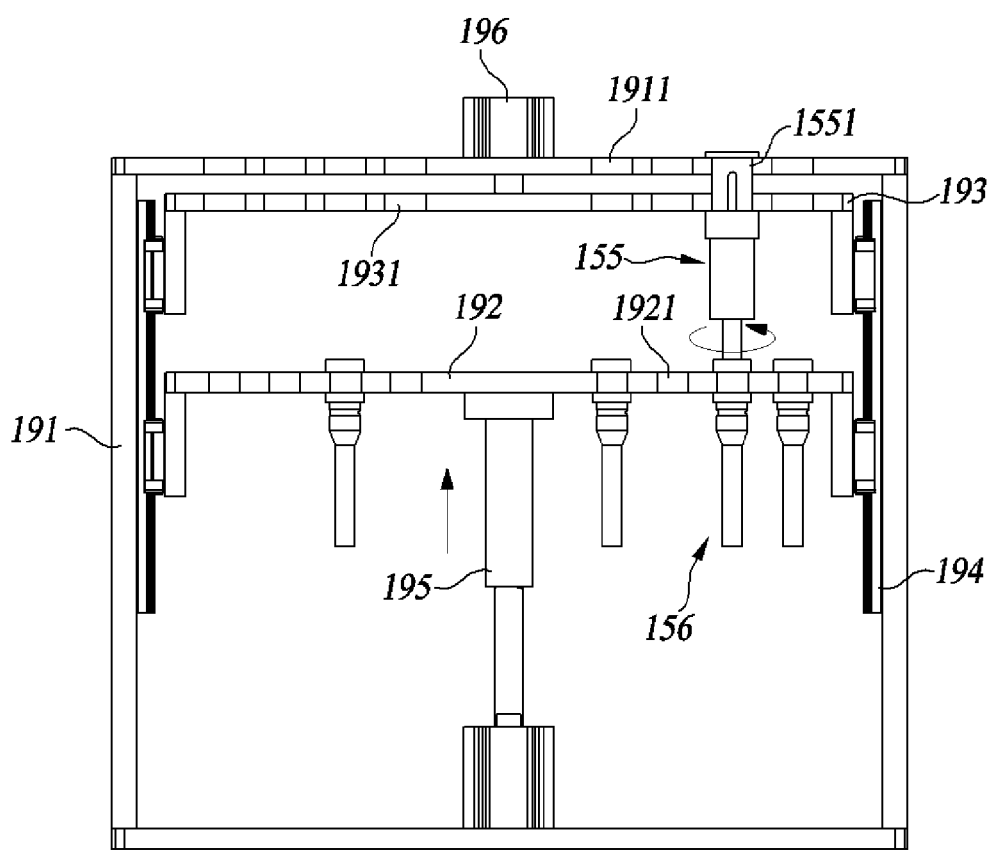

FIG. 15D illustrates a process of mounting the socket 156 in the assembly tool 152.

Referring to FIG. 15D, first, the control device 1 fixes the assembly tool 152 to first engagement groove 1911 and a third engagement groove 1931 corresponding to a position at which a socket to be fastened (hereinafter, referred to as a "fastening target socket") is located, as described with reference to FIG. 15A. Thereafter, the control device 1 moves the movement prevention unit 193 downward as described with reference to FIG. 15B to prevent movement that may occur when the socket 156 is mounted.

After the movement prevention unit 193 is moved down, the socket detachable unit 192 is moved up such that the socket insertion part 1552a of the telescope 155 is inserted into the socket insertion groove 1552b of the socket 156, thereby mounting the socket 156 in the assembly tool 152. At this time, the socket insertion groove 1552b and the socket insertion part 1552a have polygonal cross sections corresponding to each other, and a measure to match the shapes when the socket insertion groove 1552b and the socket insertion part 1552a are coupled are additionally required. As an example of this measure, the control device 1 rotates the socket insertion part 1552a by driving the assembly tool 152 when moving the socket detachable unit 192 upward. After adjustment is performed such that the shapes of the socket insertion part 1552a and the socket insertion groove 1552b match, the socket 156 is also rotated to complete coupling.

Figure 16:
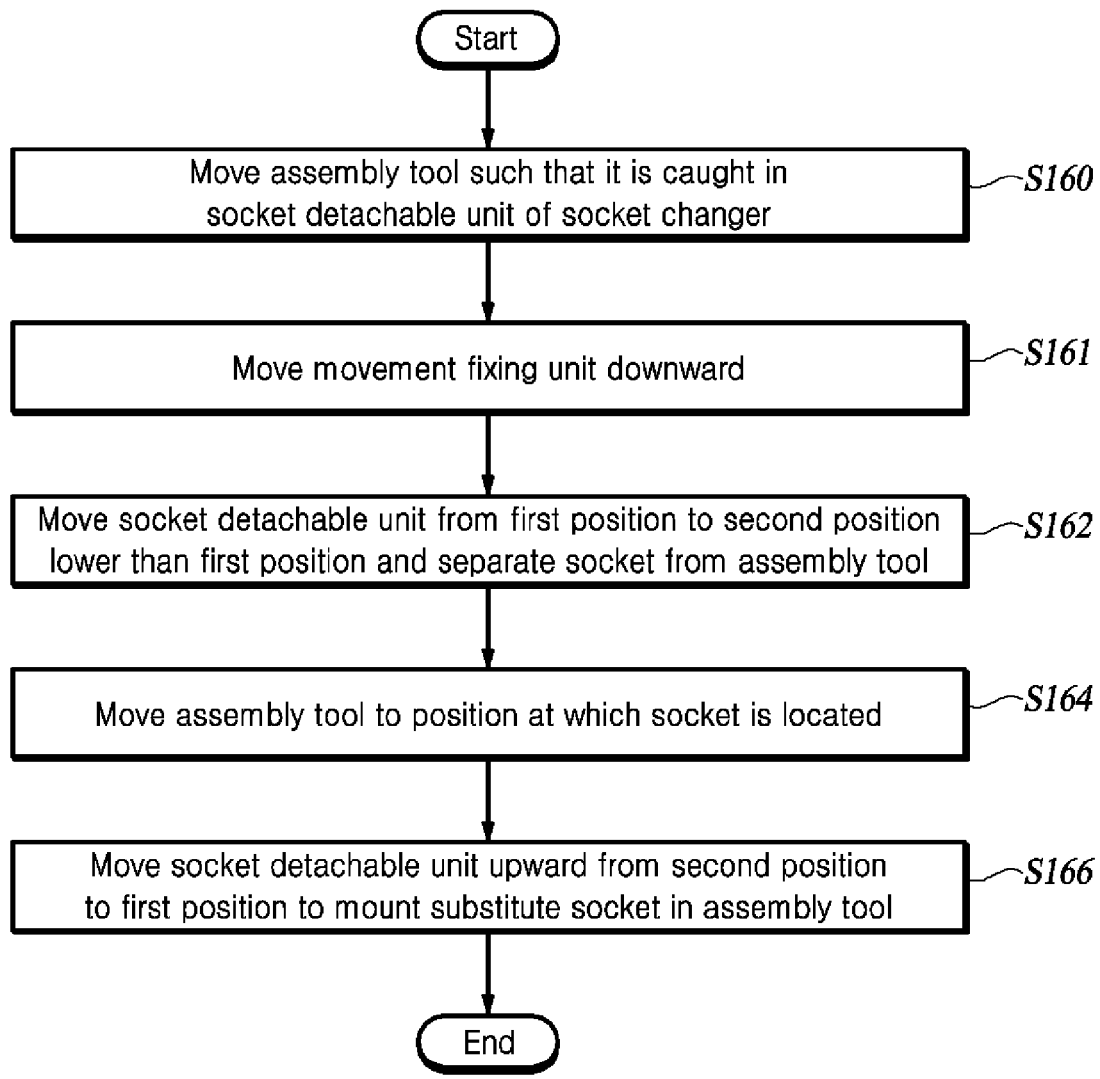
FIG. 16 is a flowchart of a socket change method using the socket changer according to an embodiment of the present disclosure.

FIG. 16 is a flowchart of a socket replacement method using the socket changer according to an embodiment of the present disclosure. Hereinafter, a method of mounting/separating a socket of the assembly tool 152 having the telescoper 155 will be described with reference to FIG. 16. Hereinafter, redundant description in FIGS. 15A to 15D and FIG. 16 will be omitted.

The control device 1 moves the assembly tool 152 such that it is caught by the socket detachable unit 192 of the socket changer 19 (S160). Step S160 corresponds to details described with reference to FIG. 15A.

The control device 1 moves the movement prevention unit 193 downward to prevent movement occurring due to the elastic member 1553 in the telescoper 155 (S161). Step S161 corresponds to details described with reference to FIG. 15B. Step S161 is a process that can be omitted when the assembly tool 152 does not include the telescoper 155.

The control device 1 moves the socket detachable unit 192 from the first position to the second position lower than the first position to separate the socket 156 from the assembly tool 152 (S162). Step S162 corresponds to details described with reference to FIG. 15C.

The control device 1 moves the assembly tool 152 to a position at which a substitute socket is located (S164).

The control device 1 moves the socket detachable unit 192 upward from the second position to the first position to mount the substitute socket 156 in the assembly tool 152 (S166). Step S166 corresponds to details described with reference to FIG. 15D.

Figure 17:
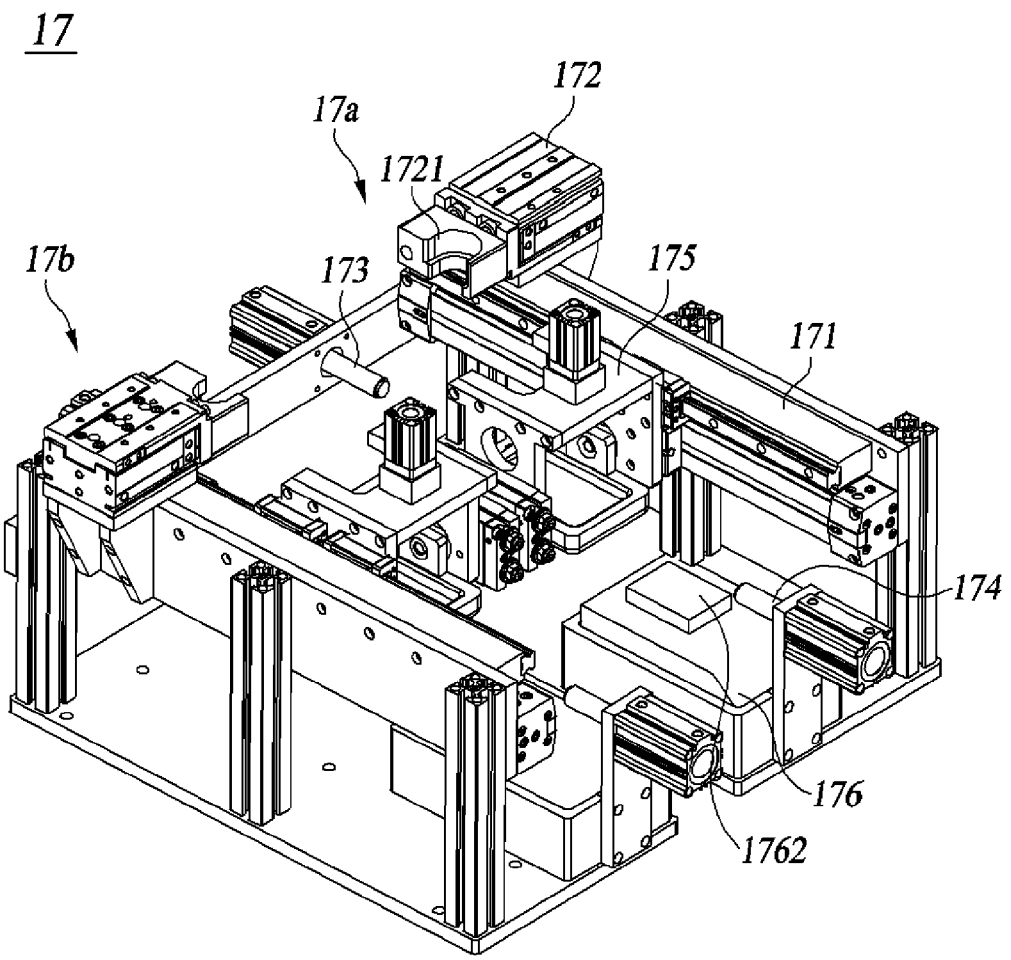
FIG. 17 is a perspective view of a battery changer according to an embodiment of the present disclosure.

FIG. 17 is a perspective view of a battery changer according to an embodiment of the present disclosure.

The battery changer 17 is a device provided to automatically replace the battery 154 of the assembly tool 152 disposed at the end of the assembly robot 15. The battery changer 17 may include two battery attaching/detaching devices 17a and 17b.

The battery attaching/detaching devices 17a and 17b are configured to mount and detach the battery 154 of the assembly tool 152. Specifically, the battery attaching/detaching devices 17a and 17b detach the battery 154 disposed at the end 1521 of the assembly tool 152 and transfer the battery 154 to a charger in the battery attaching/detaching devices 17a and 17b or mount the battery 154 coupled to the charger 176 at the end 1521 of the assembly tool 152.

The battery changer 17 includes at least a first battery attaching/detaching device 17a and a second battery attaching/detaching device 17b. Upon determining that the remaining charge capacity of the battery 154 mounted in the assembly tool 152 is lower than a preset value, the control device 1 may control the movement of the assembly robot 15 to move the battery 154 to a battery attaching/detaching area P. After the battery 154 is moved to the battery attaching/detaching area P, the control device 1 may perform a process of replacing the battery 154 with a fully charged battery 154.

Here, the battery attaching/detaching area P refers to a position at which the battery 154 is mounted on or detached from the end 1521 of the assembly tool 152 in the battery attaching/detaching devices 17a and 17b. Since coordinate information regarding the battery attaching/detaching area P is stored in the control device 1 in advance, the assembly tool 152 can be moved to a predetermined position without a vision sensor such as an additional camera.

The control device 1 moves the battery 154 to one of the first and second battery attaching/detaching devices 17a and 17b in which the battery 154 is not being charged in the charger 176 in order to change batteries. That is, the control device 1 moves the battery 154 mounted on the end 1521 of the assembly tool 152 to a battery attaching/detaching area P where the battery 154 is not coupled to the charger 176. For example, when the control device 1 moves the battery 154 mounted on the end 1521 of the assembly tool 152 to the battery attaching/detaching area P of the first battery attaching/detaching device 17a, the battery 154 mounted on the end 1521 of the assembly tool 152 is detached and moved to the charger 176 in the first battery attaching/detaching device 17a. Thereafter, the control device 1 moves the assembly tool 152 such that the end 1521 of the assembly tool 152 is positioned in the battery attaching/detaching area P of the second battery attaching/detaching device 17b. In the second battery attaching/detaching device 17b, the control device 1 mounts a fully charged battery 154 coupled to the charger 176 on the end 1521 of the assembly tool 152.

Figure 18:
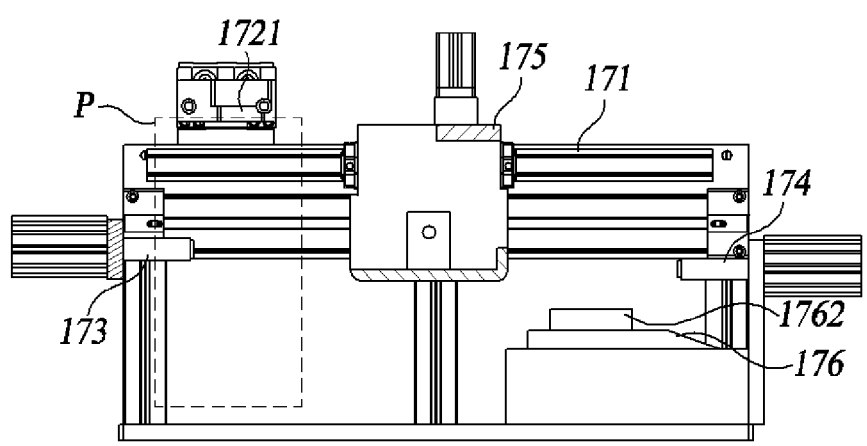
FIG. 18 is a side view of a battery attaching/detaching device according to an embodiment of the present disclosure.

FIG. 18 is a side view of a battery attaching/detaching device according to an embodiment of the present disclosure.

Referring to FIG. 18, the battery attaching/detaching devices 17a and 17b include all or some of an attaching/detaching frame 171, an assembly tool fixing part 172, a first unlock rod 173, a second unlock rod 174, a battery transport unit 175, and the charger 176.

The charger 176 is disposed in the attaching/detaching frame 171. The charger 176 may be disposed such that a charging terminal 1762 faces upward.

The assembly tool fixing part 172 is disposed on the upper portion of the attaching/detaching frame 171 in proximity to the battery attaching/detaching area P. The assembly tool fixing part 172 is a device for fixing the assembly tool 152 when the battery mounted on the assembly tool 152 is mounted or detached.

The assembly tool fixing part 172 is configured to move forward toward the assembly tool 152 after the assembly tool 152 is disposed in the battery attaching/detaching area P. A fixing groove 1721 having a shape corresponding to the cross-sectional shape of the assembly tool 152 is provided at a free end of the assembly tool fixing part 172. For example, the fixing groove 1721 may have a semicircular shape for fixing the assembly tool 152 having a circular cross section.

When the assembly tool 152 is not disposed in the battery attaching/detaching area P, the assembly tool fixing part 172 is moved backward outside the attaching/detaching frame 171 and maintained. The assembly tool fixing part 172 may move forward or backward by a pneumatic cylinder, but is not limited thereto.

The first unlock rod 173 may be disposed at one end in the longitudinal direction of the attaching/detaching frame 171. This is for the purpose of pushing the battery 154 toward the battery transport unit 175 when the battery mounted on the end 1521 of the assembly tool 152 is removed. The first unlock rod 173 is disposed such that it can move forward toward the inside of the attaching/detaching frame 171 to push the battery 154 mounted on the end 1521 of the assembly tool 152.

The first unlock rod 173 may move forward to push the battery 154 located in the battery attaching/detaching area P to release a fixing pin for fixing coupling of the battery 154 and the assembly tool 152. After the fixing pin is released, the battery 154 coupled to the end 1521 of the assembly tool 152 is detached in a sliding manner. The detached battery 154 is moved toward the battery transport unit 175 in a standby state.

The first unlock rod 173 may move forward or backward by a pneumatic cylinder, but is not limited thereto.

The second unlock rod 174 is disposed at the other end in the longitudinal direction of the attaching/detaching frame 171. The second unlock rod 174 is disposed such that it detaches the battery 154 coupled to the charger 176 when the battery 154 is being charged by being coupled to the charger 176 instead of the end 1521 of the assembly tool 152. That is, the second unlock rod 174 is provided to push the battery 154 toward the battery transport unit 175 when the battery 154 coupled to the charger 176 is moved to the battery transport unit 175. The second unlock rod 174 is disposed such that it can move forward toward the inside of the attaching/detaching frame 171 to push the battery 154 coupled to the charger 176.

The second unlock rod 174 moves forward and pushes the battery 154 in the charger 176 to release the fixing pin for fixing coupling of the battery 154 and the charger 176. After the fixing pin is released, the battery 154 coupled to the charger 176 is detached in a sliding manner. The detached battery 154 is moved toward the battery transport unit 175 in a standby state. The second unlock rod 174 may move forward or backward by a pneumatic cylinder, but is not limited thereto.

The battery transport unit 175 is a device for transporting the battery 154 while moving along a movement path between the end 1521 of the assembly tool 152 and the charger 176. Specifically, in the battery transport unit 175 is a device for transporting the battery 154 such that the battery 154 moves from the charger 176 to the end 1521 of the assembly tool 152 and is mounted on the end 1521 of the assembly tool 152 or the battery 154 moves from the end 1521 of the assembly tool 152 to the charger 176 and is mounted in the charger 176.

The battery attaching/detaching devices 17a and 17b may be disposed on a plane such as the base 11 of the part assembly system 10 using collaborative robots. Therefore, when the assembly tool 152 is located in the battery attaching/detaching area P, a terminal 1541 of the battery 154 needs to face upward such that the battery 154 is mounted on the end 1521 of the assembly tool 152.

On the other hand, since a charging terminal 1762 of the charger 176 is disposed upward, the terminal 1541 of the battery 154 needs to face downward in order for the battery 154 to be mounted on the charger 176. Accordingly, a separate driving unit may be provided to rotate the battery 154 to turn the terminal 1541 of the battery 154 upside down when the battery transport unit 175 transports the battery 154 between the end 1521 of the assembly tool 152 and the charger 176. For example, the battery transport unit 175 may be configured to rotate the battery 154 by 180 degrees to turn the terminal 1541 of the battery 154 upside down.

The driving unit may operate using an electric motor or a pneumatic cylinder. The battery transport unit 175 can adjust a degree of rotation of the battery 154 according to the position of the end of the assembly tool 152 and the position of the charging terminal 1762 of the charger 176, but need not necessarily rotate the battery 154 by 180 degrees to turn the terminal 1541 of the battery 154 upside down.

FIGS. 19A to 19D are views illustrating a process of detaching a battery mounted on the end of the assembly tool using the battery attaching/detaching device.

Figure 19A:
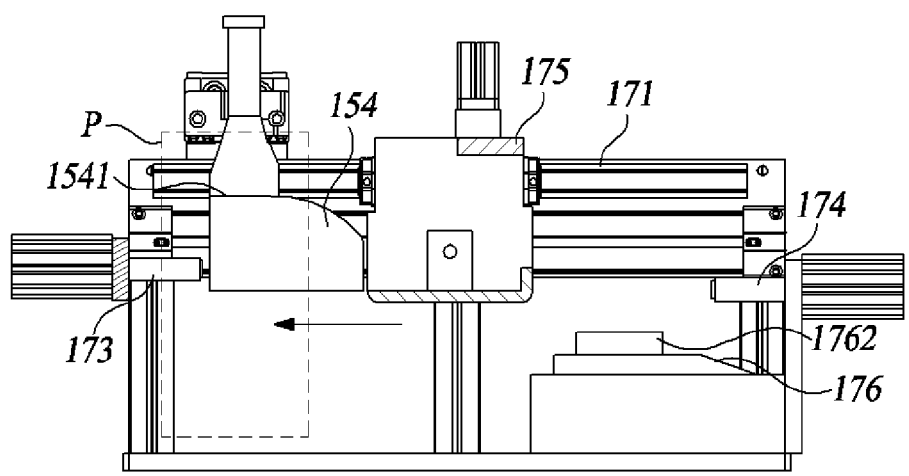
FIGS. 19A to 19D are views illustrating a process of detaching a battery mounted on an end of the assembly tool using the battery attaching/detaching device.

FIG. 19A illustrates a process in which the assembly tool 152 is disposed in the battery attaching/detaching area P to fix movement by the assembly tool fixing part 172.

Referring to FIG. 19A, after the controller 1 moves the assembly tool 152 and the battery 154 mounted on the end 1521 of the assembly tool 152 to the battery attaching/detaching area P, the assembly tool fixing part 172 moves forward toward the assembly tool 152 to fix movement of the assembly tool 152.

Figure 19B:
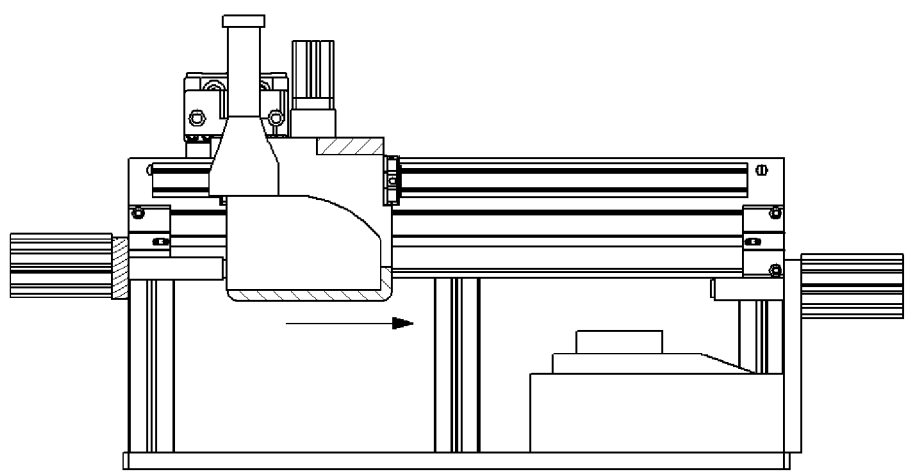

FIG. 19B illustrates a process in which the battery 154 mounted on the end 1521 of the assembly tool 152 is detached by the first unlock rod 173.

Referring to FIG. 19B, the first unlock rod 173 moves forward toward the battery 154 by a pneumatic cylinder. The battery transport unit 175 waits at a predetermined position near the battery attaching/detaching area P in order to receive the detached battery 154. The first unlock rod 173 that has moved forward releases the fixing pin for fixing coupling of the battery 154 and the end 1521 of the assembly tool 152, detaches the battery 154 and transfers the detached battery 154 to the battery transport unit 175.

Figure 19C:
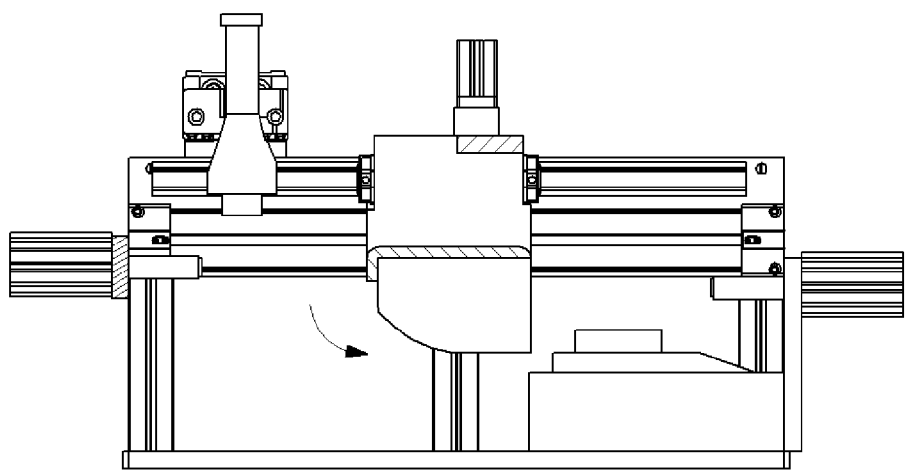

FIG. 19C illustrates a process in which the detached battery 154 is transferred to the charger 176 by the battery transport unit 175.

Referring to FIG. 19C, the terminal 1541 of the battery 154 separated from the end 1521 of the assembly tool 152 is disposed to face upward. In order to mount the battery 154 on the charger 176, the charging terminal 1762 of the charger 176 and the terminal 1541 of the battery 154 need to be coupled to each other in contact with each other. Accordingly, the control device 1 controls the battery transport unit 175 to rotate the terminal 1541 of the battery 154 such that the terminal 1541 faces down. The battery transport unit 175 rotates the battery 154 at a position between the end 1521 of the assembly tool 152 and the charger 176. After the terminal 1541 of the battery 154 is turned upside down, the battery transport unit 175 moves toward the charger 176.

Figure 19D:
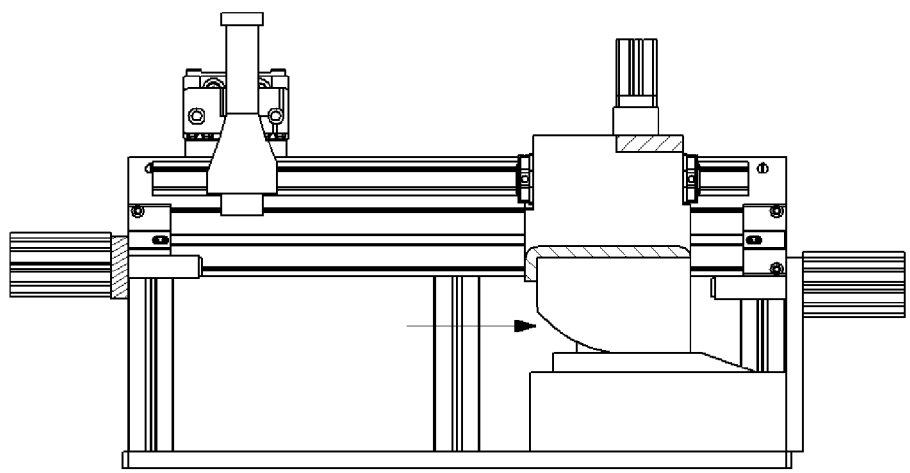

FIG. 19D illustrates a process in which the battery 154 is mounted on the charger 176.

Referring to FIG. 19D, as the battery transport unit 175 moves toward the charger 176, the battery 154 in the battery transport unit 175 is mounted on the charger 176. As the battery 154 is mounted on the charger 176 in a sliding manner, the terminal 1541 of the battery 154 may come into contact with the charging terminal 1762 of the charger 176 and thus the battery 154 can be charged. When the battery 154 is mounted on the top of the charger 176 in a sliding manner, coupling of the battery 154 and the charger 176 can be fixed by a fixing pin of the battery 154.

Figure 20:
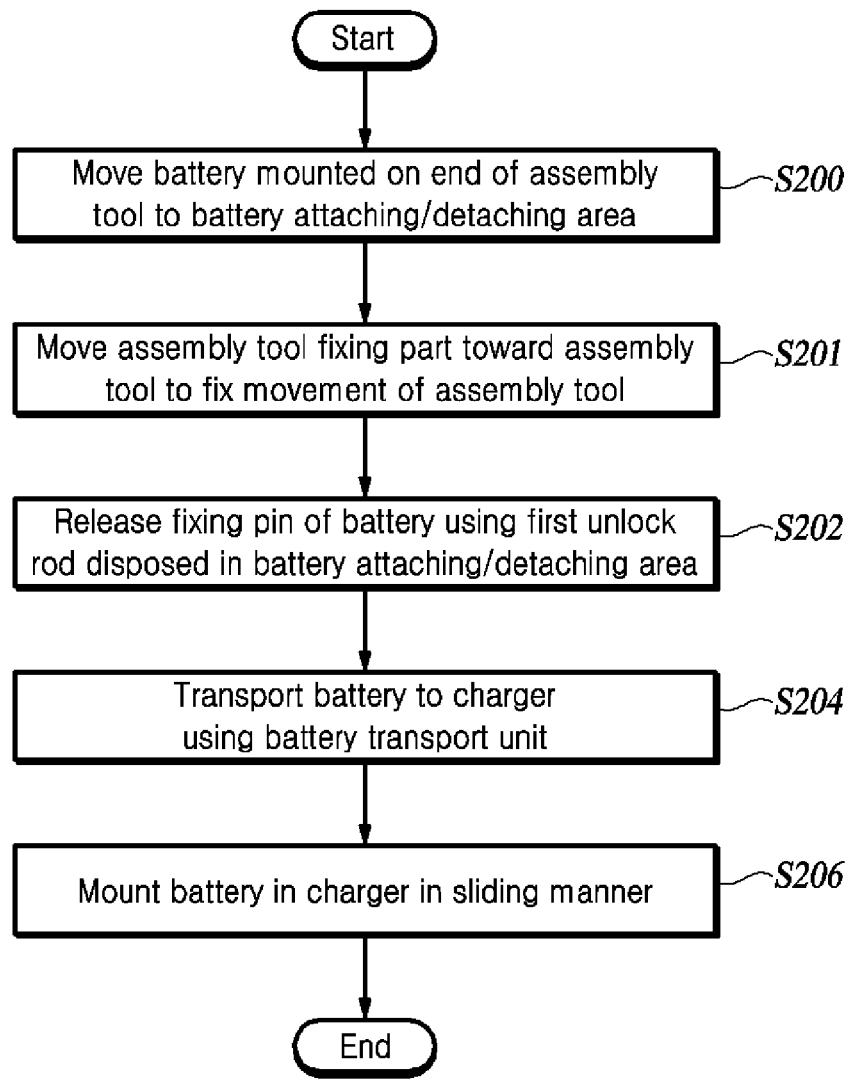
FIG. 20 is a flowchart illustrating a process of detaching a battery mounted on an end of the assembly tool and mounting the battery in a charger in a method of controlling the battery attaching/detaching device according to an embodiment of the present disclosure.

FIG. 20 is a flowchart illustrating a process of detaching a battery mounted on the end of the assembly tool and mounting the battery on the charger in the method of controlling the battery attaching/detaching device according to an embodiment of the present disclosure.

The control device 1 performs control such that the battery 154 mounted on the end 1521 of the assembly tool 152 is moved to the battery attaching/detaching area P (S200). The control device 1 may perform control such that the assembly tool 152 faces upwards and the battery 154 faces downward in the battery attaching/detaching area P.

The control device 1 stores coordinate information regarding the battery attaching/detaching area P in advance and thus does not require a vision sensor such as a camera when moving the assembly tool 152 to the battery attaching/detaching area P, but the present disclosure is not limited thereto.

The control device 1 performs controls such that the assembly tool fixing part 172 moves forward toward the assembly tool 152 and fixes the movement of the assembly tool 152 (S201). The control device 1 may control forward or backward movement of the assembly tool fixing part 172 by controlling the pneumatic pressure of a pneumatic cylinder connected to the assembly tool fixing part 172. The control device 1 may move the assembly tool fixing part 172 forward toward the assembly tool 152 until the fixing groove 1721 of the assembly tool fixing part 172 comes into contact with the assembly tool 152.

The control device 1 performs control for releasing the fixing pin of the battery 154 using the first unlock rod 173 disposed in the battery attaching/detaching P (S202). The control device 1 may release the fixing pin by moving the first unlock rod 173 toward the battery 154, and then detach the battery 154 from the end 1521 of the assembly tool 152 in a sliding manner. The detached battery 154 is moved toward the battery transport unit 175. After the battery 154 is detached from the assembly tool 152, the control device 1 may retract the assembly tool fixing part 172 to release the assembly tool 152.

The control device 1 performs control for transporting the battery 154 to the charger 176 using the battery transport unit 175 moving between the charger 176 and the battery attaching/detaching area P (S203). At this time, the position of the terminal 1541 of the battery 154 when it has been detached from the end 1521 of the assembly tool 152 may be different from the position of the terminal 1541 of the battery 154 for being coupled to the charger 176. Accordingly, the control device 1 may perform control for changing the position of the terminal 1541 of the battery 154 by rotating the battery 154 in the battery transport unit 175. For example, the control device 1 may rotate the battery 154 in the battery transport unit 175 by 180 degrees to move the terminal 1541 of the battery 154 from the top to the bottom.

The control device 1 controls the process of mounting the battery 154 on the charger 176 in a sliding manner (S204). The control device 1 can mount the battery 154 on the charger 176 such that the terminal 1541 of the battery 154 can easily come into contact with the charging terminal 1762 of the charger 176 by moving the battery transport unit 175 toward the charger 176. When the battery 154 is mounted on the charger 176, coupling is fixed by the fixing pin.

Figure 21A:
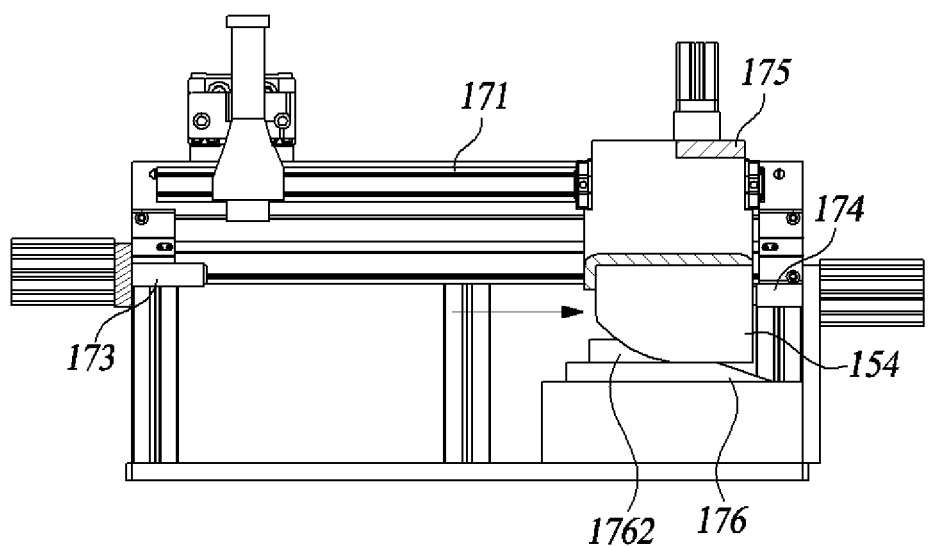
FIGS. 21A to 21C are views illustrating a process of mounting a battery on an end of the assembly tool using the battery attaching/detaching device.
Figure 21B:
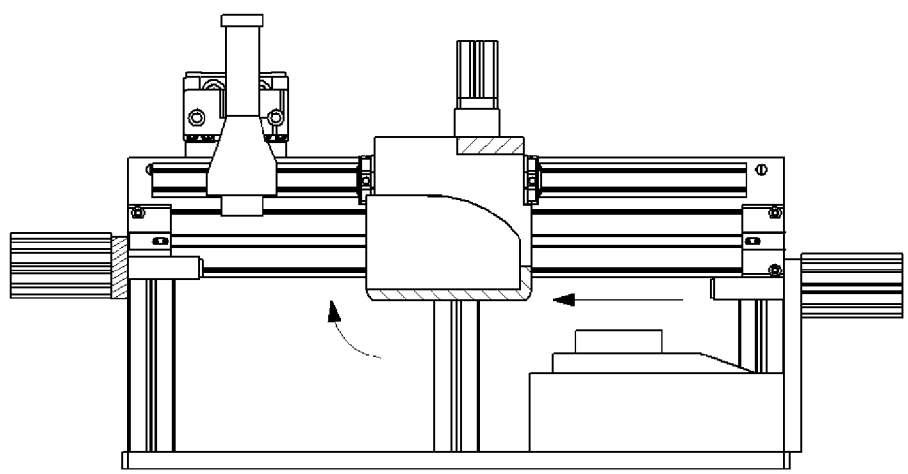
Figure 21C:
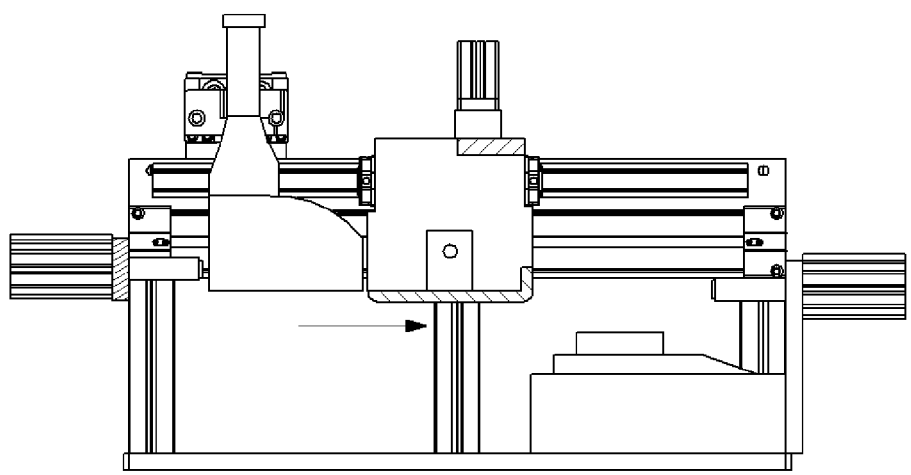

FIGS. 21A to 21C are views illustrating a process of mounting a battery on the end of the assembly tool using the battery attaching/detaching device.

FIG. 21A illustrates a process in which the battery 154 mounted on the charger 176 is detached by the second unlock rod 174.

Referring to FIG. 21A, the second unlock rod 174 moves forward toward the battery 154 by a pneumatic cylinder. The battery transport unit 175 waits at a predetermined position near the charger 176 in order to receive the detached battery 154. The second unlock rod 174 that has moved forward releases the fixing pin for fixing coupling of the battery 154 and the charger 176, detaches battery 154, and delivers the detached battery 154 to the battery transport unit 175.

FIG. 21B illustrates a process in which the detached battery 154 is transported to the end 1521 of the assembly tool 152 by the battery transport unit 175.

Referring to FIG. 21B, the terminal 1541 of the battery 154 detached from the charger 176 is disposed to face downward. In order to mount the battery 154 on the end 1521 of the assembly tool 152, the terminal 1541 of the battery 154 needs to be in contact with the end 1521 of the assembly tool 152. Accordingly, the control device 1 controls the battery transport unit 175 to rotate the battery 154 such that the terminal 1541 of the battery 154 faces upward. The battery transport unit 175 rotates the battery 154 at a position between the end 1521 of the assembly tool 152 and the charger 176. After the terminal 1541 of the battery 154 is vertically reversed, the battery transport unit 175 moves toward the end 1521 of the assembly tool 152.

FIG. 21C illustrates a process in which the battery 154 is mounted on the end 1521 of the assembly tool 152.

Referring to FIG. 21C, the battery 154 in the battery transport unit 175 is mounted on the end 1521 of the assembly tool 152 as the battery transport unit 175 is moved toward the end 1521 of the assembly tool 152. The battery 154 is mounted on the end 1521 of the assembly tool 152 in a sliding manner such that the terminal 1541 of the battery 154 and the end 1521 of the assembly tool 152 come into contact with each other. When the battery 154 is mounted on the end 1521 of the assembly tool 152 in a sliding manner, coupling of the battery 154 and the assembly tool 152 may be fixed by the fixing pin of the battery 154.

Figure 22:
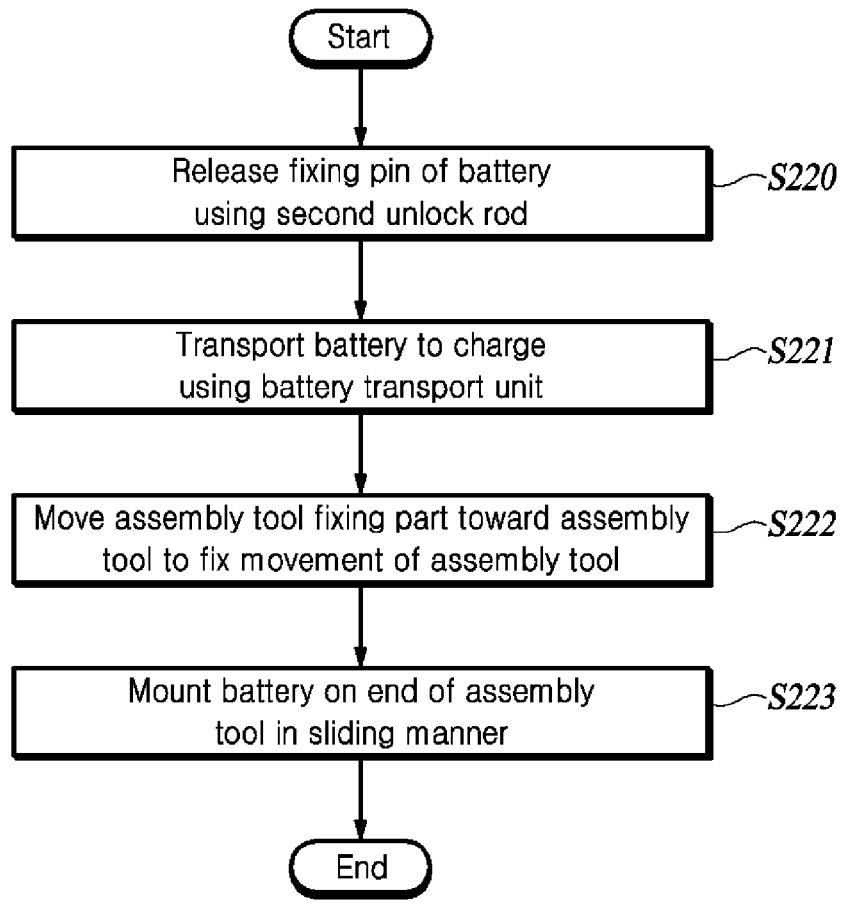
FIG. 22 is a flowchart illustrating a process of detaching a battery mounted in the charger and mounting the battery on an end of the assembly tool in the method of controlling the battery attaching/detaching device according to an embodiment of the present disclosure.

FIG. 22 is a flowchart illustrating a process of detaching the battery mounted on the charger and mounting the battery on the end of the assembly tool in the method of controlling the battery attaching/detaching device according to an embodiment of the present disclosure.

The control device 1 performs control for releasing the fixing pin of the battery 154 using the second unlock rod 174 disposed adjacent to the charger 176 (S220). The control device 1 may release the fixing pin by moving the second unlock rod 174 forward toward the battery 154 disposed on the charger 176 and then detach the battery 154 from the charger 176 in a sliding manner. The detached battery 154 is moved toward the battery transport unit 175.

The control device 1 performs control for transporting the battery 154 to the charger 176 using the battery transport unit 175 that moves between the charger 176 and the battery attaching/detaching area P (S221). At this time, the position of the terminal 1541 of the battery 154 when it has been detached from the end 1521 of the assembly tool 152 may be different from the position of the terminal 1541 of the battery 154 for being coupled to the charger 176. Accordingly, the control device 1 may perform control for changing the position of the terminal 1541 of the battery 154 by rotating the battery 154 in the battery transport unit 175. For example, the control device 1 can move the terminal 1541 of the battery 154 from the bottom to the top by rotating the battery 154 in the battery transport unit 175 by 180 degrees.

The control device 1 performs control for moving the assembly tool fixing part 172 forward toward the assembly tool 152 to fix the movement of the assembly tool 152 (S222). The control device 1 may control forward or backward movement of the assembly tool fixing part 172 by controlling the pneumatic pressure of the pneumatic cylinder connected to the assembly tool fixing part 172. The control device 1 may move the assembly tool fixing part 172 forward toward the assembly tool 152 until the fixing groove 1721 of the assembly tool fixing part 172 comes into contact with the assembly tool 152. The process S222 does not necessarily have to be performed after the processes S220 and S221 are performed and may be performed before the process S220, between the processes S220 and S221, or simultaneously with the process S220 or S221.

The control device 1 performs control for mounding the battery 154 on the end 1521 of the assembly tool 152 in a sliding manner (S223). The control device 1 may mount the battery 154 such that the terminal 1541 of the battery 154 easily comes into contact with the end 1521 of the assembly tool 152 by moving the battery transport unit 175 toward the end 1521 of the assembly tool 152. When the battery 154 is mounted on the charger 176, the coupling is fixed by the fixing pin. After the battery 154 is coupled to the assembly tool 152, the control device 1 may retract the assembly tool fixing part 172 to release the assembly tool 152.

The battery changer 17 may include the first and second battery attaching/detaching devices 17a and 17b. Therefore, when the battery 154 mounted on the assembly tool 152 is replaced with a fully charged battery 154, any one of the first battery attaching/detaching device 17a and the second battery attaching/detaching device 17b performs the process of detaching the battery 154 mounted on the assembly tool 152 and the other one performs the process of mounting the fully charged battery 154 on the assembly tool 152.

Hereinafter, a case in which the process of detaching the battery 154 mounted on the assembly tool 152 is performed in the first battery attaching/detaching device 17a while the process of mounting the fully charged battery 154 on the assembly bool 152 is performed in the second battery attaching/detaching device 17b will be exemplified.

In the first battery attaching/detaching device 17a, the processes S130 to S134 of FIG. 20 are performed to detach the battery 154 mounted on the assembly tool 152 and mount the battery 154 on the charger 176. In the second battery attaching/detaching device 17b, the processes S220 to S223 of FIG. 22 are performed to mount the fully charged battery 154 on the assembly tool 152.

Hereinafter, in the battery changer 17, processes added to the control processes shown in FIGS. 20 and 22 will be described in detail.

After step S132 in which the battery 154 is detached from the end 1521 of the assembly tool 152 is performed in the first battery attaching/detaching device 17a, the control device 1 moves the assembly tool fixing part 172 backward and controls the assembly tool 152 to move to the battery attaching/detaching area P of the second battery attaching/detaching device 17b. The first battery attaching/detaching device 17a performs the remaining processes S133 and S134 after the assembly tool 152 is moved to the battery attaching/detaching area P of the first battery attaching/detaching device 17a. On the other hand, the control device 1 may move the assembly tool 152 to the battery attaching/detaching area P of the second battery attaching/detaching device 17b after steps S133 and S134 end in the first battery attaching/detaching device 17a. After the assembly tool 152 and the battery 154 are separated from each other in the first battery attaching/detaching device 17a, the control device 1 may move the assembly tool 152 to the battery attaching/detaching area P of the second attaching/detaching device 17b irrespective of whether steps S133 and S134 are performed.

In the second battery attaching/detaching device 17b, the assembly tool 152 may be disposed in the second battery detaching/attaching device 17b after the processes S220 and S221 are performed, or the processes S220 and S221 may be performed after the assembly tool 152 is disposed in the second battery attaching/detaching device 17b. Alternatively, after the processes S220 and S221 are performed and the assembly tool 152 is disposed in the battery attaching/detaching area P of the second battery attaching/detaching device 17b, the processes S222 and S223 are performed and the fully charged battery 154 may be mounted on the end 1521 of the assembly tool 152.

As described above, the battery 154 mounted on the assembly tool 152 operating wirelessly can be automatically replaced with another battery using the battery changer 17 including the first and second battery attaching/detaching devices 17a and 17b without manual operation.

Figure 23:
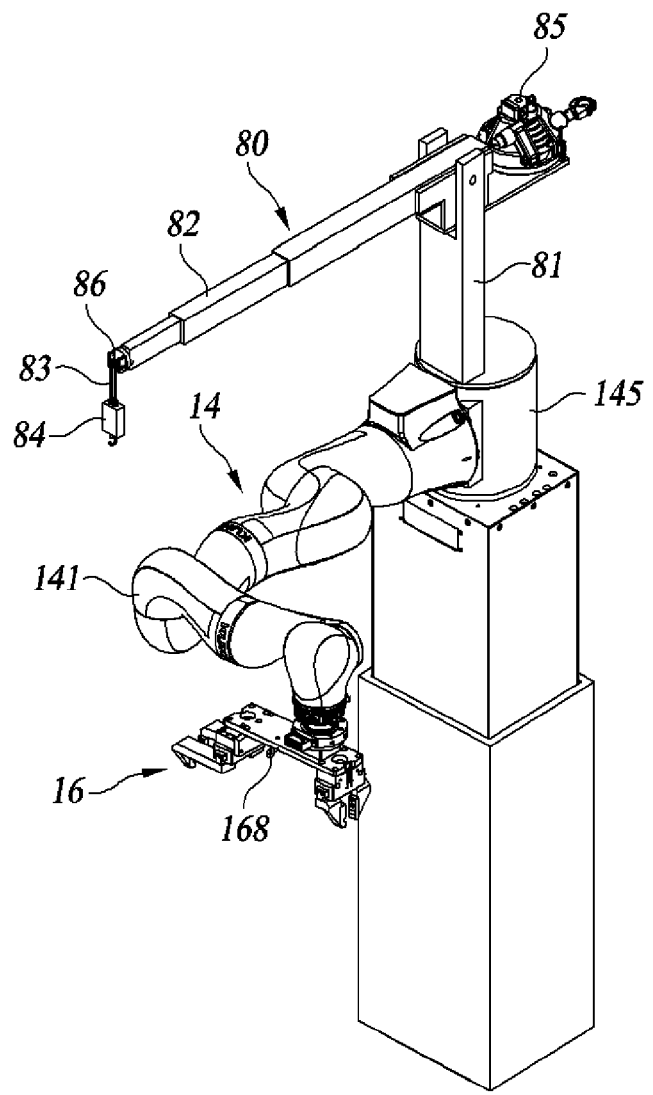
FIG. 23 is a perspective view of a weight compensation robot according to an embodiment of the present disclosure.
Figure 24:
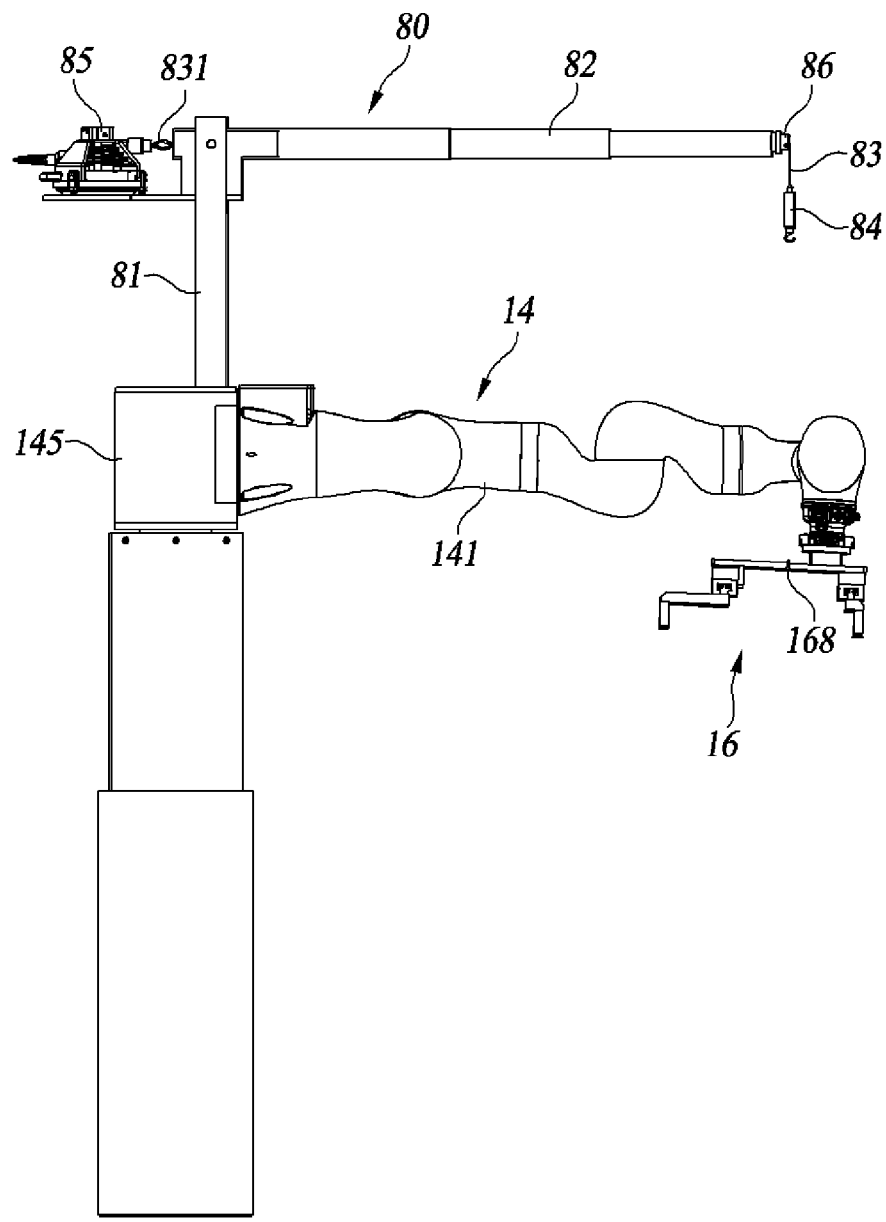
FIG. 24 is a side view of the weight compensation robot according to an embodiment of the present disclosure.

FIG. 23 is a perspective view of a weight compensation robot according to an embodiment of the present disclosure. FIG. 24 is a side view of the weight compensation robot according to an embodiment of the present disclosure.

Referring to FIGS. 23 and 24, the weight compensation robot includes a loading robot 14, a weight compensation module 80, and a control device 1. The control device 1 may control the overall operations of the loading robot 14 and the weight compensation module 80. A detailed description of the loading robot 14 will be omitted below.

The weight compensation module 80 includes all or some of a post 81, a boom 82, a wire 83, a weight compensation part 85, and a gripper coupling part 84. The weight compensation module 80 may be connected to a part of the loading robot 14 to reduce the weight of a modular component 132 which is equal to or greater than a preset weight limit of the loading robot 14 when the loading robot 14 grips and moves the modular component 132.

The post 81 is disposed to extend from the rotation support 145 of the loading robot 14. The post 81 is disposed to extend upwardly from the rotation support 145 in the vertical direction.

The boom 82 is coupled to the upper portion of the post 81. The boom 82 is coupled to the upper portion of the post 81 so as to be perpendicular to the post 81. The boom 82 may be arranged to extend in a direction parallel to the direction in which the loading robot 14 extends from the rotation support 145. The boom 82 may be formed in a hollowed structure. The boom 82 may include a plurality of booms having different cross-sectional areas. The plurality of booms extends or retracts in a telescopic manner such that the length of the boom 82 can be varied.

The boom 82 may rotate with the rotation support 145 when the rotation support 145 rotates. That is, when the loading robot 14 rotates around the axis of rotation of the rotation support 145, the post 81 may also rotate.

The wire 83 penetrates the boom 82 and is disposed to extend in the direction of gravity from one end of the boom 82. A roller 86 may be disposed at one end of the boom 82 to guide the movement of the wire 83.

One end of the wire 83 is a fixed end 831 and the other end is a free end. The gripper coupling part 84 provided to be coupled to a coupling ring 168 of the gripper 16 is coupled to the free end of the wire 83. The weight compensation part 85 is connected to the fixed end 831 of the wire 83. Here, the weight compensation part 85 may be a spring balancer. The gripper coupling part 84 is connected to the coupling ring 168 of the gripper 16, and when the loading robot 14 grips the modular component 132, the weight compensation connected to the fixed end 831 of the wire 83 may reduce the weight of the modular component 132.

The length of the wire 83 may be increased or decreased such that the wire 83 descends or ascends in the direction of gravity from one end of the boom 82. The control device 1 may control the length of the wire 83 to adjust upward/downward movement of the gripper coupling part 84 coupled to the free end of the wire 83.

Figure 25:
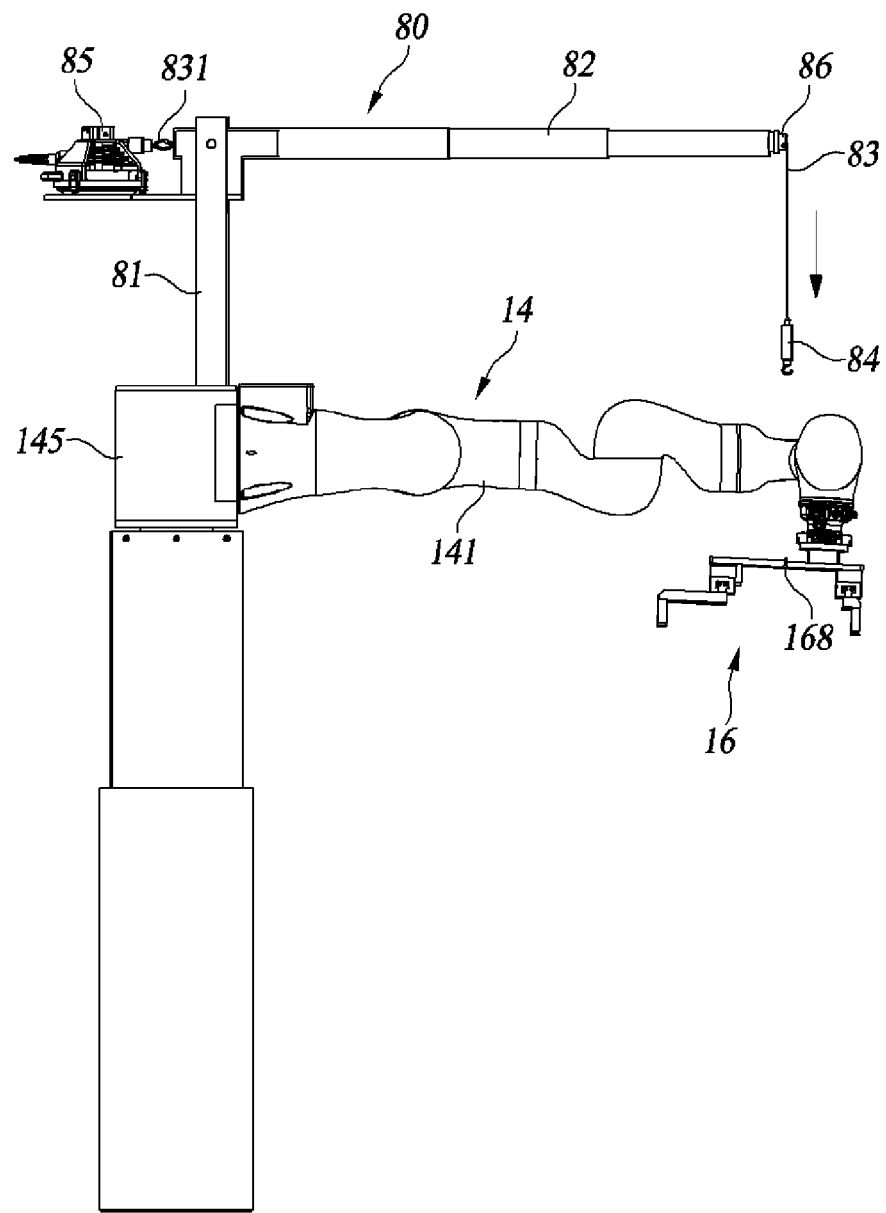
FIG. 25 is a view for describing a process in which the weight compensation robot of FIG. 24 connects a weight compensation module to the gripper.
Figure 26:
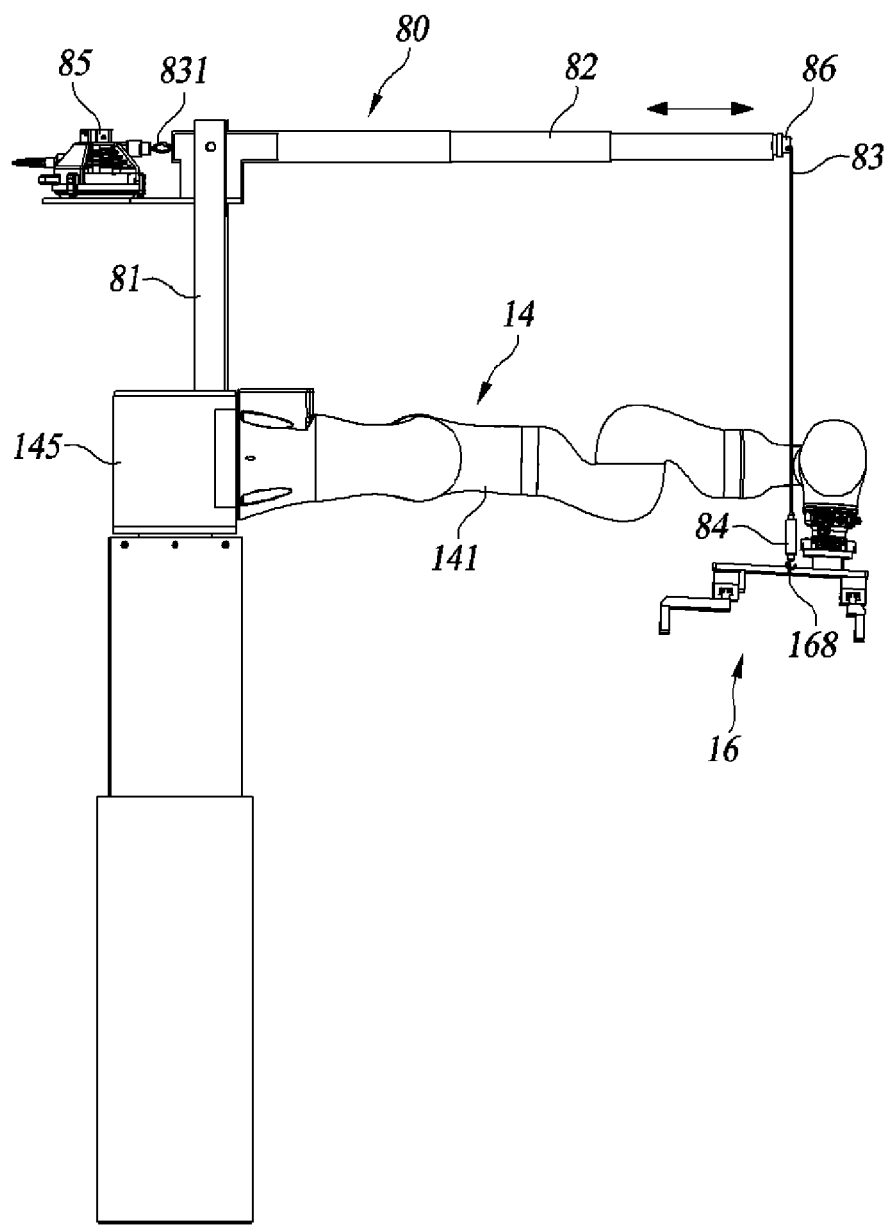
FIG. 26 is a view for describing a process in which the loading robot operates after the weight compensation module of FIG. 25 is connected to the gripper.

FIG. 25 is a view for describing a process in which the weight compensation robot of FIG. 24 connects the weight compensation module to the gripper. FIG. 26 is a view for describing a process in which the loading robot operates after the weight compensation module of FIG. 25 is connected to the gripper. Although the control device 1 can generally control the overall operation of each electronic equipment shown in FIG. 1, a case in which the control device 1 controls the operations of the loading robot 14 and the weight compensation module 80 will be described below.

The control device 1 moves the gripper coupling part 84 downward by adjusting the length of the wire 83. At this time, the control device 1 controls the coupling ring 168 of the gripper 16 to be positioned in the moving line on which the gripper coupling part 84 descends. Information on a position at which the coupling ring 168 of the gripper 16 is coupled to the gripper coupling part 84 may be stored in advance in the control device 1. The control device 1 may control the position of the gripper 16 using the information stored in advance.

Grippers 16 having various shapes may be mounted at the end of the loading robot 14, and the position of the coupling ring 168 may be different for each gripper 16. In this case, the control device 1 may store information on a position for coupling to the gripper coupling part 84 according to the type of the gripper 16.

After the control device 1 moves the gripper coupling part 84 downward and couples it to the coupling ring 168 of the gripper 16, the control device 1 controls the loading robot 14 to grip the modular component 132.

The control device 1 may determine whether to couple the gripper coupling part 84 to the coupling ring 168 of the gripper 16 depending on the weight of the modular component 132. For example, upon determining that the loading robot 14 loads a first modular component having a weight less than the preset weight limit, the control device 1 does not couple the gripper coupling part 84 to the coupling ring 168. Here, the preset weight limit may be set to a maximum weight that the loading robot 14 can load the modular component 132 by itself, but is not limited thereto and may vary according to the specifications of the loading robot 14.

Upon determining that the loading robot 14 loads a second modular component having a weight greater than or equal to the preset weight limit, the control device 1 controls the gripper coupling part 84 to be coupled to the coupling ring 168 of the gripper 16. Coupling of the gripper coupling part 84 and the coupling ring 168 is performed before the gripper 16 grips the second modular component. The control device 1 controls the operation of the loading robot 14 such that the coupling ring 168 is positioned at a preset coupling position. Thereafter, the control device 1 couples the gripper coupling part 84 to the coupling ring 168 by moving the gripper coupling part 84 downward. Here, the preset coupling position may be located on a path in which the gripper coupling part 84 descends in the direction of gravity.

Referring to FIG. 26, after the gripper coupling part 84 and the coupling ring 168 are coupled, the control device 1 controls the operation of the loading robot 14 to load the second modular component. A part of the weight of the second modular component is transmitted to the wire 83 connected to the gripper coupling part 84, and the weight may be supported by the weight compensation part 85 coupled to the fixed end 831 of the wire 83.

In addition, after the gripper coupling part 84 and the coupling ring 168 are coupled, the weight compensation module 80 moves along with the movement of the loading robot 14. When the gripper 16 is controlled to move away from the rotation support 145, the boom 82 also extends. When the gripper 16 is controlled to approach the rotation support 145, the boom 82 also retracts. That is, the length of the boom 82 may vary according to the operating position of the gripper 16.

After loading of the second modular component 132 is finished, upon determining that assistance of the weight compensation module 80 is no longer necessary, the control device 1 moves the gripper 16 back to the preset coupling position and then separates the gripper coupling part 84 from the coupling ring 168.

Figure 27:
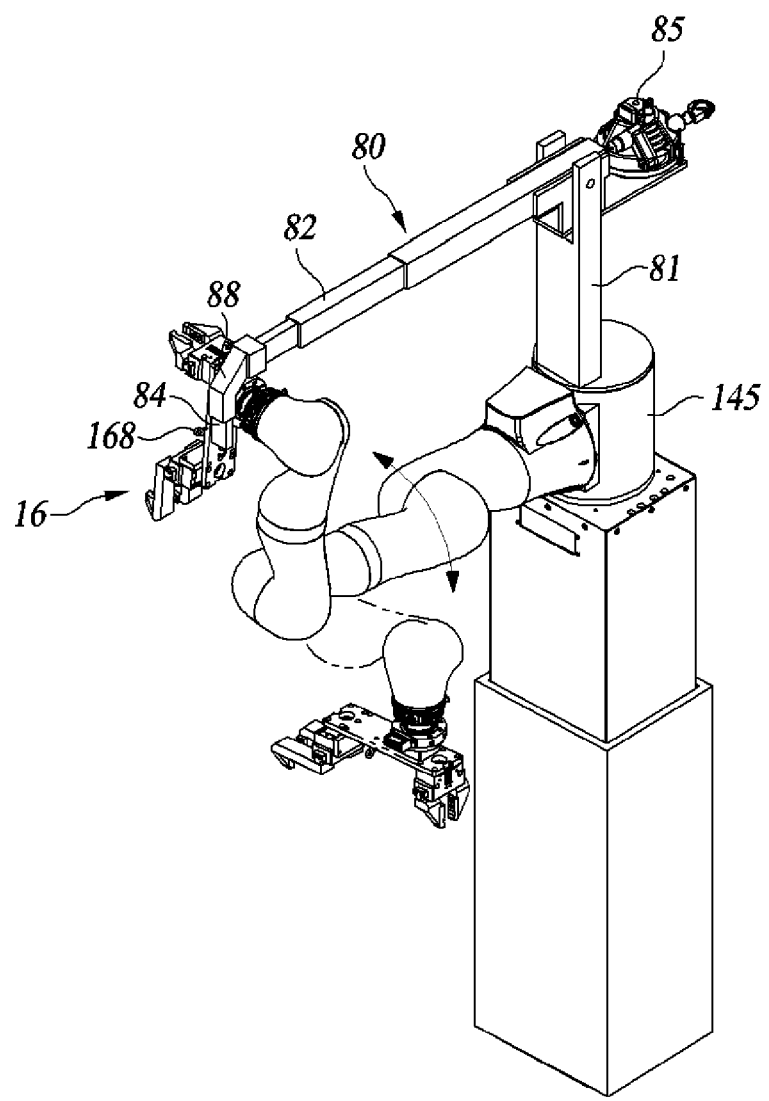
FIG. 27 is a perspective view of a weight compensation robot according to a second embodiment of the present disclosure.

FIG. 27 is a perspective view of a weight compensating robot according to a second embodiment of the present disclosure. Descriptions of redundant parts will be omitted.

The weight compensation robot according to the second embodiment further includes a guide cap 88 provided at the free end of the boom 82. The guide cap 88 is configured to have a hollowed structure, and one end of the guide cap 88 is coupled to the free end of the boom 82 and the other end is configured to fix the movement of the gripper coupling part 84. The wire 83 is disposed to penetrate the guide cap 88.

The cross-sectional shape of the other end of the guide cap 88 corresponds to the cross-sectional shape of the gripper coupling part 84. Accordingly, the gripper coupling part 84 may be partially inserted into the other end of the guide cap 88 by being pulled by the weight compensation part 85. The gripper coupling part 84 is partially inserted into the other end of the guide cap 88 and thus shaking or movement thereof can be prevented.

In the second embodiment, the control device 1 moves the gripper 16 to a preset position and then moves the wire 83 downward, and thus the gripper coupling part 84 is not coupled to the coupling ring 168. Conversely, as shown in FIG. 27, the control device 1 controls the loading robot 14 to move the coupling ring 168 of the gripper 16 toward the gripper coupling part 84. At this time, since the gripper coupling part 84 is inserted into the guide cap 88 and thus the movement of the gripper coupling part 84 is fixed, the coupling ring 168 of the gripper 16 can be stably coupled to the gripper coupling part 84.

According to an embodiment, the assembly system for automation of assembly of modular components has the effects of reducing the cost by minimizing the manpower for assembling modular components and improving productivity by constructing an assembly automation system that excludes manual operations.

Although exemplary embodiments of the present disclosure have been described for illustrative purposes, those skilled in the art will appreciate that various modifications, additions, and substitutions are possible, without departing from the idea and scope of the claimed invention. Therefore, exemplary embodiments of the present disclosure have been described for the sake of brevity and clarity. The scope of the technical idea of the present embodiments is not limited by the illustrations. Accordingly, one of ordinary skill would understand the scope of the claimed invention is not to be limited by the above explicitly described embodiments but by the claims and equivalents thereof.

What is claimed is:

1. A robot system for automatically assembling a modular component and an assembly target, comprising:
   an assembly robot including (1) a first manipulator, (2) an assembly tool coupled to the first manipulator and configured to assemble the modular component and the assembly target, and (3) a first camera configured to capture images in a direction in which the assembly tool faces;
   a loading robot including (1) a second manipulator and (2) a gripper coupled to the second manipulator and configured to grip the modular component; and
   a control device configured to control the assembly robot and the loading robot,
   wherein the assembly tool comprises:
      an assembly robot coupling part coupled to the assembly robot;
      a nut runner including an output shaft;
      a telescoper connected to the output shaft and having a variable length; and
      a replaceable socket including (1) a first end having a bolt insertion groove to which a head of a bolt is inserted and (2) a second end having a socket insertion groove in which the telescoper is mounted.

2. The robot system according to claim 1, further comprising a jig configured to load the modular component at a predetermined position in order for the gripper to grip the modular component.

3. The robot system according to claim 2, further comprising a part providing robot configured to dispose the modular component at the predetermined position.

4. The robot system according to claim 1, further comprising a gripper holder configured to hold the gripper detachably coupled to the second manipulator.

5. The robot system according to claim 4, wherein:
   the gripper holder has a mounting position to which the gripper is coupled, and
   the control device stores information on the mounting position of the gripper.

6. The robot system according to claim 1, wherein the assembly tool further includes a battery mounted on the assembly tool and configured to supply power to the assembly tool.

7. The robot system according to claim 6, further comprising a battery changer for automatically attaching/detaching the battery to/from the assembly tool.

8. A robot system for automatically assembling a modular component and an assembly target, comprising:
   an assembly robot including (1) a first manipulator, (2) an assembly tool coupled to the first manipulator and configured to assemble the modular component and the assembly target, and (3) a first camera configured to capture images in a direction in which the assembly tool faces;
   a loading robot including (1) a second manipulator and (2) a gripper coupled to the second manipulator and configured to grip the modular component; and
   a control device configured to control the assembly robot and the loading robot,
   wherein the assembly tool further includes a battery mounted on the assembly tool and configured to supply power to the assembly tool,
   wherein the robot system further comprises a battery changer for automatically attaching/detaching the battery to/from the assembly tool, and
   wherein the battery changer includes a plurality of battery attaching/detaching devices, each of the plurality of battery attaching/detaching devices including:
      an attaching/detaching frame;
      a charger disposed at the attaching/detaching frame;
      a battery transport unit configured to transport the battery along a movement path between the charger and the assembly tool; and
      a first unlock rod disposed at a first end of the attaching/detaching frame in a longitudinal direction of the attaching/detaching frame and configured to push the battery toward the battery transport unit when the battery mounted on the assembly tool is detached.

9. The robot system according to claim 8, wherein the battery transport unit rotates the battery such that a terminal of the battery is coupled to a terminal of the charger when the battery is moved to the charger.

10. The robot system according to claim 8, further comprising a second unlock rod disposed at a second end of the attaching/detaching frame in the longitudinal direction of the attaching/detaching frame and configured to push the battery toward the battery transport unit when the battery coupled to the charger is moved to the battery transport unit.

11. The robot system according to claim 1, further comprising a socket changer configured to replace the replaceable socket.

12. The robot system according to claim 11, wherein the socket changer includes:
   a socket changer frame including an upper surface having a plurality of first engagement grooves; and
   a socket detachable unit disposed between both sides of the socket changer frame, including a plurality of second engagement grooves, and configured to move between a first position and a second position lower than the first position.

13. The robot system according to claim 11, wherein the socket changer includes a plurality of sockets having different detachable shapes and disposed at predetermined positions.

14. The robot system according to claim 1, wherein the first camera comprises a 2.5D vision camera.

15. The robot system according to claim 1, wherein the loading robot further includes a second camera configured to capture images in a direction in which the gripper faces.

16. The robot system according to claim 1, further comprising:
   a loading robot support disposed under the loading robot and configured to move vertically or rotate; and
   an assembly robot support disposed under the assembly robot and configured to move vertically or rotate.

* * * * *